US011408761B2

(12) United States Patent
Kobayashi

(10) Patent No.: US 11,408,761 B2
(45) Date of Patent: Aug. 9, 2022

(54) MEASUREMENT METHOD, MEASUREMENT DEVICE, MEASUREMENT SYSTEM, AND MEASUREMENT PROGRAM

(71) Applicant: Seiko Epson Corporation, Toyko (JP)

(72) Inventor: Yoshihiro Kobayashi, Komagane (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 17/203,972

(22) Filed: Mar. 17, 2021

(65) Prior Publication Data

US 2021/0293606 A1    Sep. 23, 2021

(30) Foreign Application Priority Data

Mar. 18, 2020   (JP) .............................. JP2020-047136

(51) Int. Cl.
G01L 1/10 (2006.01)
G01G 19/12 (2006.01)
G08G 1/02 (2006.01)

(52) U.S. Cl.
CPC ............... *G01G 19/12* (2013.01); *G01L 1/10* (2013.01); *G08G 1/02* (2013.01)

(58) Field of Classification Search
CPC ...... G01G 19/12; G01G 19/024; G01G 19/03; G01G 3/12; G01L 1/10; G08G 1/02; G01M 5/0008
See application file for complete search history.

(56) References Cited

U.S. PATENT DOCUMENTS 7,668,692 B2 * 2/2010 Tatom .................. G01G 19/022
                                                    702/173
10,139,308 B2 * 11/2018 Kobayashi ............ G01P 15/097
(Continued)

FOREIGN PATENT DOCUMENTS

JP    2009-237805 A    10/2009
JP    2017-020796 A    1/2017
(Continued)

OTHER PUBLICATIONS

U.S. Appl. No. 17/203,941, filed Mar. 17, 2021, Measurement Method, Measurement Device, Measurement System, and Measurement Program, Yoshihiro Kobayashi.
(Continued)

*Primary Examiner* — Freddie Kirkland, III
(74) *Attorney, Agent, or Firm* — Harness, Dickey & Pierce, P.L.C.

(57) ABSTRACT

A measurement method includes: a physical quantity acquisition step of acquiring, based on observation information obtained by at least one observation device that observes first to N-th observation points of a structure arranged along a second direction intersecting a first direction in which a moving object moves along the structure, physical quantities at the first to N-th observation points; and an action calculation step of calculating actions $x_1$ to $x_N$ on the first to N-th observation points based on the acquired physical quantities at the first to N-th observation points, on the assumption that, when a function indicating a correlation between an action $x_j$ on a j-th observation point and an action that the action $x_j$ has on an i-th observation point is set as $y_{ij}$, an acquired physical quantity at the i-th observation point is equal to a sum of values of functions $y_{i1}$ to $y_{iN}$.

14 Claims, 14 Drawing Sheets

(56) References Cited

U.S. PATENT DOCUMENTS

| | | | |
|---|---|---|---|
| 10,198,640 B2 * | 2/2019 | Kobayashi | G06V 10/431 |
| 10,768,145 B2 * | 9/2020 | Kobayashi | G01H 1/06 |
| 10,788,320 B2 * | 9/2020 | Takada | G01B 11/16 |
| 10,830,652 B2 * | 11/2020 | Irie | H04N 7/181 |
| 2009/0024336 A1 * | 1/2009 | Tatom | G01G 23/3728 702/56 |
| 2017/0098127 A1 * | 4/2017 | Kobayashi | G01P 1/127 |
| 2017/0184471 A1 * | 6/2017 | Kobayashi | G01M 5/0008 |
| 2017/0184550 A1 * | 6/2017 | Kobayashi | G01N 29/44 |
| 2021/0293604 A1 * | 9/2021 | Kobayashi | G01H 1/00 |
| 2021/0293605 A1 * | 9/2021 | Kobayashi | G01G 19/035 |
| 2021/0293657 A1 * | 9/2021 | Kobayashi | G01M 5/0066 |
| 2021/0302222 A1 * | 9/2021 | Kobayashi | G01M 5/0066 |
| 2021/0304597 A1 * | 9/2021 | Kobayashi | G01M 5/0008 |

FOREIGN PATENT DOCUMENTS

| | | |
|---|---|---|
| JP | 2018-031187 A | 3/2018 |
| JP | 2018-066637 A | 4/2018 |
| JP | 2019-049095 A | 3/2019 |

OTHER PUBLICATIONS

U.S. Appl. No. 17/203,809, filed Mar. 17, 2021, Measurement Method, Measurement Device, Measurement System, and Measurement Program, Yoshihiro Kobayashi.

U.S. Appl. No. 17/204,064, filed Mar. 17, 2021, Measurement Method, Measurement Device, Measurement System, and Measurement Program, Yoshihiro Kobayashi.

U.S. Appl. No. 17/203,799, filed Mar. 17, 2021, Measurement Method, Measurement Device, Measurement System, and Measurement Program, Yoshihiro Kobayashi.

U.S. Appl. No. 17/204,091, filed Mar. 17, 2021, Measurement Method, Measurement Device, Measurement System, and Measurement Program, Yoshihiro Kobayashi.

* cited by examiner

MEASUREMENT METHOD, MEASUREMENT DEVICE, MEASUREMENT SYSTEM, AND MEASUREMENT PROGRAM

The present application is based on, and claims priority from JP Application Serial Number 2020-047136, filed Mar. 18, 2020, the disclosure of which is hereby incorporated by reference herein in its entirety.

BACKGROUND

1. Technical Field

The present disclosure relates to a measurement method, a measurement device, a measurement system, and a measurement program.

2. Related Art

In maintaining and managing a bridge, an axle load of a large vehicle passing through the bridge is important information for predicting damage to the bridge. For axle load measurement, JP-A-2009-237805 proposes weight in motion, which is a method of continuously measuring a strain value when the vehicle passes from a strain gauge installed on a main girder of the bridge and calculating the axle load. JP-A-2009-237805 discloses a bridge-passing vehicle monitoring system that measures a vehicle weight of a vehicle passing through a bridge based on a strain waveform measured by a strain gauge arranged on a main girder of the bridge.

Specifically, in the bridge-passing vehicle monitoring system, the strain gauge is arranged, a passage timing of the axle is detected based on the strain waveform measured by the strain gauge, an inter-axle ratio of the vehicle is calculated, the calculated inter-axle ratio is compared with an inter-axle ratio calculated based on an inter-axle distance registered in an inter-axle distance database, and the inter-axle distance, a vehicle speed, and a vehicle type of the vehicle are identified. The bridge-passing vehicle monitoring system generates a strain waveform in which a reference axle load strain waveform is arranged on a time axis according to the passage timing of the axle, and calculates the axle load of each axle by comparing the reference axle load strain waveform with a strain waveform measured by the strain gauge. Then, the bridge-passing vehicle monitoring system calculates the vehicle weight by summing the axle loads of each axle.

When the vehicle travels on the bridge, the bridge floor is displaced and inclined in a width direction at the same time as the bridge floor is displaced and settled in a traveling direction of the vehicle. This means that when the vehicle passes an observation point, not only an action occurs at the observation point, but also an action occurs at other observation points. The action on each observation point changes according to the number of vehicles traveling on the bridge, a weight of each vehicle, a situation of a lane on which each vehicle travels, and the like. Therefore, in order to perform accurate measurement, it is necessary to calculate the action on the observation point when the vehicle passes through each observation point separately from other actions. The system disclosed in JP-A-2009-237805 can measure the vehicle weight of the vehicle, but the action on the observation point when a moving object such as the vehicle passes through each observation point of a structure such as the bridge cannot be calculated separately from other actions.

SUMMARY

A measurement method according to a first aspect of the present disclosure includes: a physical quantity acquisition step of acquiring, based on observation information obtained by at least one observation device that observes first to N-th observation points of a structure arranged along a second direction intersecting a first direction in which a moving object moves along the structure, physical quantities at the first to N-th observation points, N being an integer of 2 or more; and an action calculation step of calculating actions $x_1$ to $x_N$ on the first to N-th observation points based on the physical quantities at the first to N-th observation points acquired in the physical quantity acquisition step, on the assumption that, for any integer i of 1 or more and N or less and any integer j of 1 or more and N or less, when a function indicating a correlation between an action $x_j$ on a j-th observation point and an action that the action $x_j$ has on an i-th observation point is set as $y_{ij}$, a physical quantity at the i-th observation point acquired in the physical quantity acquisition step is equal to a sum of values of functions $y_{i1}$ to $y_{iN}$.

The measurement method according to the first aspect may further include: a coefficient value calculation step of acquiring physical quantities at the first to N-th observation points when a known moving object different from the moving object moves alone on the structure, and calculating a value of a coefficient of the function $y_{ij}$ based on the physical quantities at the first to N-th observation points.

In the measurement method according to the first aspect, the function $y_{ij}$ may be a polynomial function of the action $x_j$.

In the measurement method according to the first aspect, the structure may have first to N-th paths through which the moving object is able to move, and the first to N-th observation points may be associated with the first to N-th paths.

In the measurement method according to the first aspect, the physical quantities at the first to N-th observation points acquired in the physical quantity acquisition step may be displacements or loads generated by the moving object.

In the measurement method according to the first aspect, the observation device may be an acceleration sensor.

In the measurement method according to the first aspect, the observation device may be a contact displacement meter, a ring displacement meter, a laser displacement meter, a pressure sensor, a displacement measurement device based on image processing, or a displacement measurement device based on an optical fiber.

In the measurement method according to the first aspect, the physical quantities at the first to N-th observation points acquired in the physical quantity acquisition step may be physical quantities in a third direction intersecting the first direction and the second direction.

In the measurement method according to the first aspect, the moving object may be a railroad vehicle, an automobile, a tram, a construction vehicle, or a military vehicle.

In the measurement method according to the first aspect, the structure may be a superstructure of a bridge, the superstructure may be a structure across any one of a bridge abutment and a bridge pier adjacent to each other, two adjacent bridge abutments, or two adjacent bridge piers, both end portions of the superstructure may be located at positions of the bridge abutment and the bridge pier adjacent to each other, at positions of the two adjacent bridge abutments, or at positions of the two adjacent bridge piers, and the bridge may be a road bridge or a railway bridge.

In the measurement method according to the first aspect, the structure may be a structure in which bridge weigh in motion (BWIM) functions.

A measurement device according to a second aspect of the present disclosure includes: a physical quantity acquisition unit that acquires, based on observation information obtained by at least one observation device that observes first to N-th observation points of a structure arranged along a second direction intersecting a first direction in which a moving object moves along the structure, physical quantities at the first to N-th observation points, N being an integer of 2 or more; and an action calculation unit that calculates actions $x_1$ to $x_N$ on the first to N-th observation points based on the physical quantities at the first to N-th observation points acquired by the physical quantity acquisition unit on the assumption that, for any integer i of 1 or more and N or less and any integer j of 1 or more and N or less, when a function indicating a correlation between an action $x_j$ on a j-th observation point and an action that the action $x_j$ has on an i-th observation point is set as $y_{ij}$, a physical quantity at the i-th observation point acquired by the physical quantity acquisition unit is equal to a sum of values of functions $y_{i1}$ to $y_{iN}$.

A measurement system according to a third aspect of the present disclosure includes: the measurement device according to the first aspect; and the observation device.

A non-transitory computer-readable storage medium according to a fourth aspect of the present disclosure stores a measurement program, the measurement program causing a computer to execute: a physical quantity acquisition step of acquiring, based on observation information obtained by at least one observation device that observes first to N-th observation points of a structure arranged along a second direction intersecting a first direction in which a moving object moves along the structure, physical quantities at the first to N-th observation points, N being an integer of 2 or more; and an action calculation step of calculating actions $x_1$ to $x_N$ on the first to N-th observation points based on the physical quantities at the first to N-th observation points acquired in the physical quantity acquisition step, on the assumption that, for any integer i of 1 or more and N or less and any integer j of 1 or more and N or less, when a function indicating a correlation between an action $x_j$ on a j-th observation point and an action that the action $x_j$ has on an i-th observation point is set as $y_{ij}$, a physical quantity at the i-th observation point acquired in the physical quantity acquisition step is equal to a sum of values of functions $y_{i1}$ to $y_{iN}$.

DESCRIPTION OF EXEMPLARY EMBODIMENTS

Hereinafter, embodiments of the present disclosure will be described in detail with reference to the drawings. The embodiments described below do not in any way limit contents of the present disclosure described in the appended claims. Not all configurations described below are necessarily essential components of the present disclosure.

1. First Embodiment 1-1. Measurement System

Hereinafter, a measurement system for implementing a measurement method according to the present embodiment will be described by taking a case where a structure is a superstructure of a bridge and a moving object is a vehicle as an example. The vehicle passing through the bridge according to the present embodiment is a vehicle that has a large weight and can be measured by bridge weigh in motion (BWIM), such as a railroad vehicle, an automobile, a tram, a construction vehicle, or a military vehicle. The BWIM is a technology that uses a bridge as a "scale" and that measures the weight and the number of axles of the vehicle passing through the bridge by measuring deformation of the bridge. The superstructure of the bridge, which enables analysis of the weight of the vehicle passing by based on a response such as deformation and strain, is a structure in which the BWIM functions. A BWIM system, which applies a physical process between an action on the superstructure of the bridge and the response, enables the measurement of the weight of the vehicle passing by.

Figure 1:
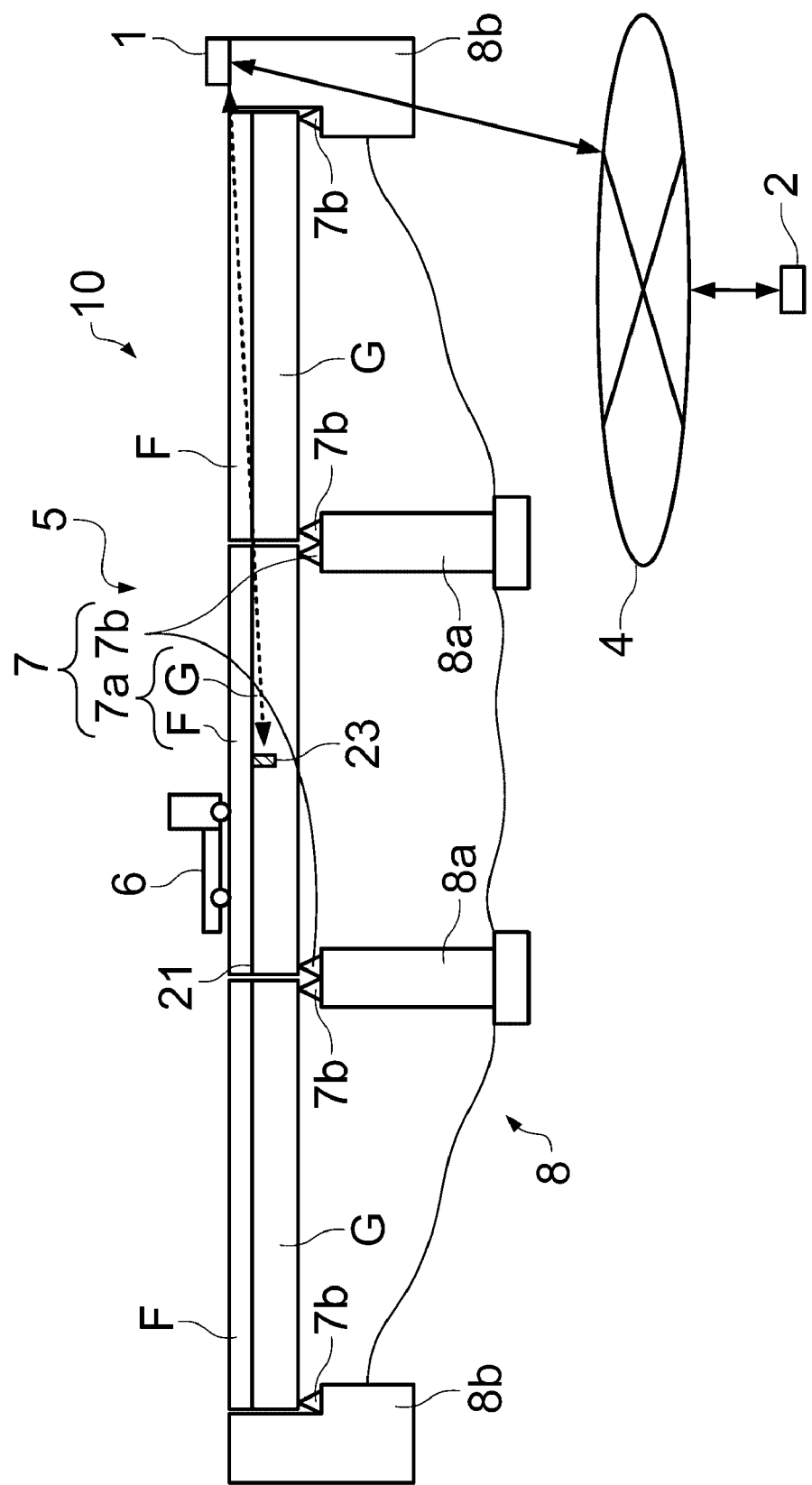
FIG. 1 is a diagram showing a configuration example of a measurement system.

FIG. 1 is a diagram showing an example of a measurement system according to the present embodiment. As shown in FIG. 1, a measurement system 10 according to the present embodiment includes a measurement device 1, and a plurality of sensors 23 provided on a superstructure 7 of a bridge 5. Further, the measurement system 10 may include a server 2.

The bridge 5 includes the superstructure 7 and a substructure 8. The superstructure 7 includes a bridge floor 7a formed of a floor plate F, a main girder G, and a cross girder which is not shown, and bearings 7b. The substructure 8 includes bridge piers 8a and bridge abutments 8b. The superstructure 7 is a structure across any one of the bridge abutment 8b and the bridge pier 8a adjacent to each other, two adjacent bridge abutments 8b, or two adjacent bridge piers 8a. Both end portions of the superstructure 7 are located at positions of the bridge abutment 8b and the bridge pier 8a adjacent to each other, at positions of the two adjacent bridge abutments 8b, or at positions of the two adjacent bridge piers 8a.

The measurement device 1 and each of the sensors 23 are coupled by, for example, a cable which is not shown and communicate with each other via a communication network such as a controller area network (CAN). Alternatively, the measurement device 1 and each of the sensors 23 may communicate with each other via a wireless network.

For example, each sensor 23 outputs data for calculating a displacement of the superstructure 7 due to the movement of the vehicle 6 which is the moving object. In the present embodiment, each of the sensors 23 is an acceleration sensor, and may be, for example, a crystal acceleration sensor or a micro electro mechanical systems (MEMS) acceleration sensor.

In the present embodiment, each sensor 23 is installed at a central portion of the superstructure 7 in the longitudinal direction. Each sensor 23 only needs to be able to detect the acceleration for calculating the displacement of the superstructure 7, and an installation position of each sensor is not limited to the central portion of the superstructure 7.

The floor plate F, the main girder G, and the like of the superstructure 7 are bent in a vertical direction due to a load of the vehicle 6 traveling on the superstructure 7. Each sensor 23 detects the acceleration of the bending of the floor plate F and the main girder G due to the load of the vehicle 6 traveling on the superstructure 7.

The measurement device 1 calculates, based on acceleration data output from the sensors 23, the displacement of the bending of the superstructure 7 due to the traveling of the vehicle 6. The measurement device 1 calculates a load of the vehicle 6 traveling on the superstructure 7 based on the calculated displacement.

The measurement device 1 and the server 2 can communicate with each other via, for example, a wireless network of a mobile phone and a communication network 4 such as the Internet. The measurement device 1 transmits, to the server 2, information such as a time point when the vehicle 6 travels on the superstructure 7 and the displacement of the superstructure 7 due to the traveling of the vehicle 6. The server 2 may store the information in a storage device which is not shown, and may perform, based on the information, processing such as monitoring of an overloaded vehicle or determination of an abnormality in the superstructure 7.

In the present embodiment, the bridge 5 is a road bridge, for example, a steel bridge, a girder bridge, or a reinforced-concrete (RC) bridge.

Figure 2:
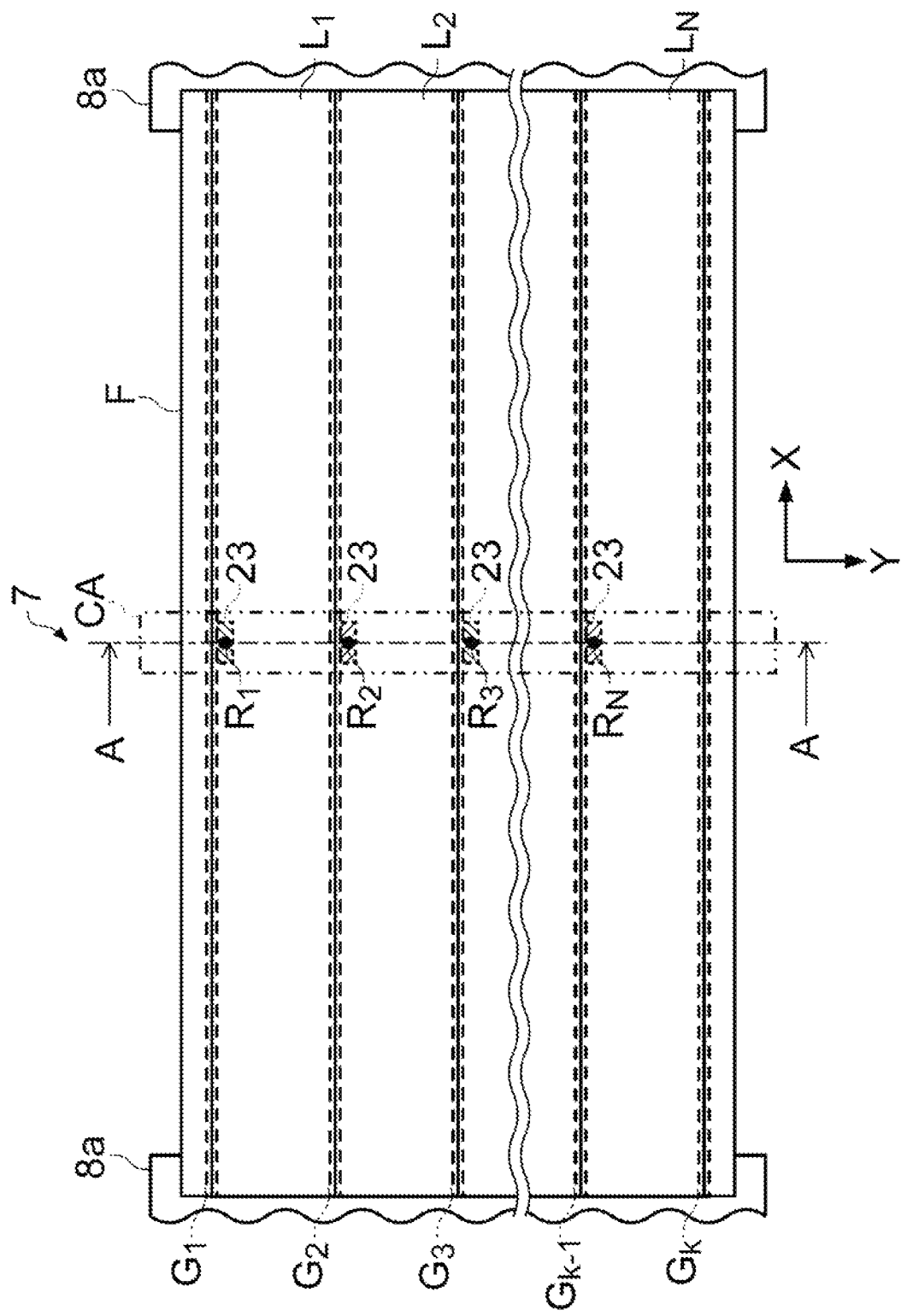
FIG. 2 is a diagram showing an arrangement example of sensors and observation points.
Figure 3:
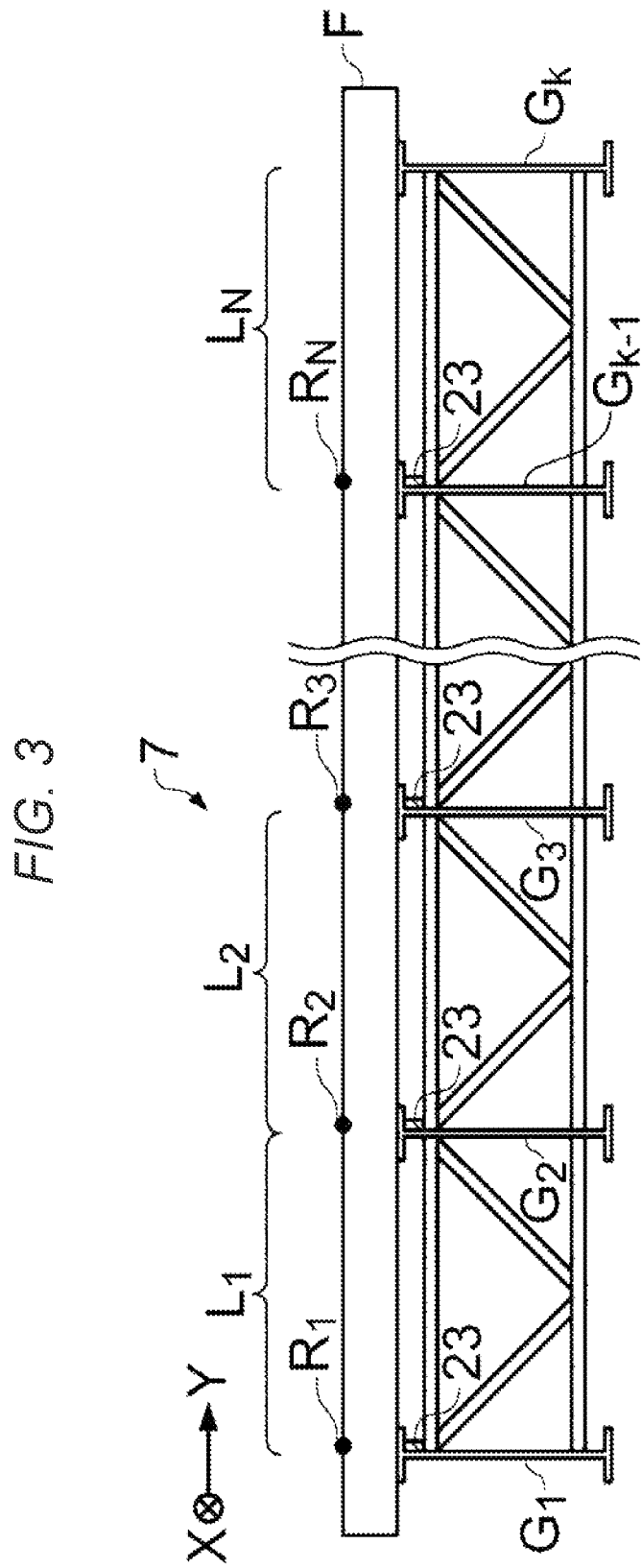
FIG. 3 is a diagram showing an arrangement example of the sensors and the observation points.

FIGS. 2 and 3 are diagrams showing an installation example of the sensors 23 on the superstructure 7. FIG. 2 is a diagram of the superstructure 7 as viewed from above. FIG. 3 is a cross-sectional view of FIG. 2 cut along a line A-A.

As shown in FIGS. 2 and 3, the superstructure 7 has K main girders $G_1$ to $G_K$ and N lanes $L_1$ to $L_N$ as first to N-th paths through which the vehicle 6, which is the moving object, can move. Here, N is an integer of 1 or more, and K is an integer of 2 or more. In the example shown in FIGS. 2 and 3, each position of the main girders $G_1$ to $G_K$ coincides with a position of each boundary between the lanes $L_1$ to $L_N$, and N=K−1. Alternatively, each position of the main girders $G_1$ to $G_K$ does not have to coincide with the position of each boundary between the lanes $L_1$ to $L_N$, and N≠K−1.

In the example shown in FIGS. 2 and 3, the sensor 23 is provided on each of the main girders $G_1$ to $G_{K-1}$ at a central portion CA of the superstructure 7 in the longitudinal direction. In the example shown in FIGS. 2 and 3, N=K−1, and the main girder $G_K$ is not provided with the sensor 23. However, the main girder $G_K$ may be provided with the sensor 23, and any one among the main girders $G_1$ to $G_{K-1}$ may not be provided with the sensor 23. Alternatively, N=K, and the sensors 23 may be provided on the main girders $G_1$ to $G_K$, respectively.

When the sensors 23 are provided on the floor plate F of the superstructure 7, the sensors may be destroyed by a traveling vehicle, and measurement accuracy may be affected by local deformation of the bridge floor 7a. Therefore, in the example shown in FIGS. 2 and 3, the sensors are provided on the main girders $G_1$ to $G_{K-1}$ of the superstructure 7.

In the present embodiment, N observation points $R_1$ to $R_N$ are set in association with the N sensors 23. The observation points $R_1$ to $R_N$ are N observation points of the superstructure 7 which are arranged along a second direction intersecting a first direction in which the vehicle 6 moves along the superstructure 7. In the example shown in FIGS. 2 and 3, for each integer j or 1 more and N or less, an observation point $R_j$ is set at a position on the surface of the floor plate F in a vertically upward direction of the sensor 23 provided on the main girder $G_j$ at the central portion CA. That is, the sensor 23 provided on the main girder $G_j$ is an observation device that observes the observation point R The sensor 23 that observes the observation point R may be provided at a position where the acceleration generated at the observation point $R_j$ due to the traveling of the vehicle 6 can be detected, and it is desirable that the sensor 23 is provided at a position close to the observation point $R_j$. In this way, the observation points $R_1$ to $R_N$ have a one-to-one relationship with the N sensors 23.

In the present embodiment, N observation points $R_1$ to $R_N$ are associated with the lanes $L_1$ to $L_N$, respectively. In the example shown in FIGS. 2 and 3, the first direction is an X direction along the lanes $L_1$ to $L_N$ of the superstructure 7, that is, the longitudinal direction of the superstructure 7. The second direction is a Y direction orthogonal to the X direction in a plane of the superstructure 7 on which the vehicle 6 travels, that is, a width direction of the superstructure 7. However, the second direction may not be orthogonal to the first direction. For example, distances from one end of the superstructure 7 to the observation points $R_1$ to $R_N$ may be different. The observation points $R_1$ to $R_N$ are examples of a "first observation point" to an "N-th observation point", respectively.

The number and installation positions of the sensors 23 are not limited to the example shown in FIGS. 2 and 3, and various modifications can be made.

The measurement device 1 acquires, based on the acceleration data output from each of the sensors 23, an acceleration in a third direction which intersects the X direction, which is the first direction, and the Y direction, which is the second direction. Since the observation points $R_1$ to $R_N$ bend in the direction orthogonal to the X and Y directions, in order to accurately calculate a magnitude of the acceleration of the bending, it is desirable for the measurement device 1 to acquire an acceleration in the third direction orthogonal to the X direction and the Y direction, that is, in a normal direction of the floor plate F.

Figure 4:
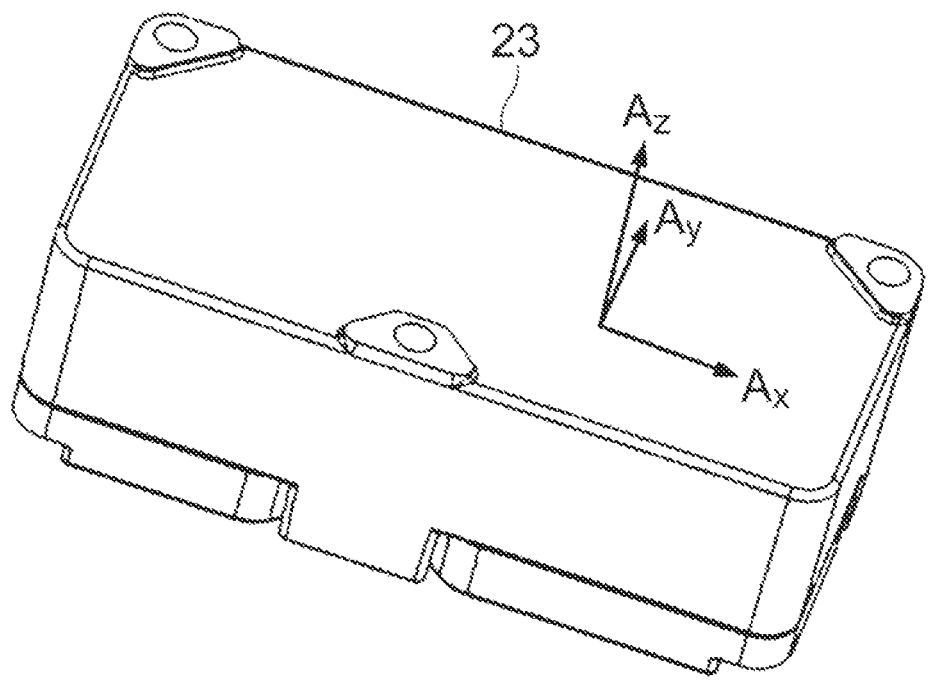
FIG. 4 is a diagram illustrating an acceleration detected by an acceleration sensor.

FIG. 4 is a diagram illustrating the acceleration detected by the sensor 23. The sensor 23 is an acceleration sensor that detects the accelerations generated in three axes orthogonal to one another.

In order to detect the acceleration of the bending at the observation points $R_1$ to $R_N$ due to the traveling of the vehicle 6, each sensor 23 is installed such that one of three detection axes, which are an x axis, a y axis, and a z axis, intersects the first direction and the second direction. In the example shown in FIGS. 2 and 3, since the first direction is the X direction, the second direction is the Y direction, each of the sensors 23 is installed such that one axis is in a direction that intersects the X direction and the Y direction. The observation points $R_1$ to $R_N$ bend in the direction orthogonal to the X direction and the Y direction. Therefore, in order to accurately detect the acceleration of the bending, ideally, each sensor 23 is installed such that one axis is in the direction orthogonal to the X direction and the Y direction, that is, the normal direction of the floor plate F.

When the sensors 23 are installed on the superstructure 7, an installation location may be inclined. In the measurement device 1, even if one of the three detection axes of each of the sensors 23 is not installed in the normal direction of the floor plate F, since the direction is substantially oriented in the normal direction, an error is small and thus can be ignored. Even if one of the three detection axes of each sensor 23 is not installed in the normal direction of the floor plate F, the measurement device 1 can correct a detection error caused by the inclination of the sensor 23 by a three-axis combined acceleration obtained by combining accelerations in the x axis, the y axis, and the z axis. Each of the sensors 23 may be a one-axis acceleration sensor that detects an acceleration generated in a direction at least substantially parallel to the vertical direction or the acceleration in the normal direction of the floor plate F.

Hereinafter, details of the measurement method according to the present embodiment executed by the measurement device 1 will be described.

1-2. Calculation of Action

When the vehicle 6 travels on the lane $L_1$, an action $x_1$ occurs at the observation point $R_1$ due to a load generated by the vehicle 6. Therefore, the observation point $R_1$ is displaced due to the action $x_1$. At this time, when the vehicle 6 travels alone on the superstructure 7, the action generated at the observation points $R_2$ to $R_N$ by the load due to the vehicle traveling in the lanes $L_2$ to $L_N$ is zero. However, since the action $x_1$ has an effect on the observation points $R_2$ to $R_N$, the observation points $R_2$ to $R_N$ are also displaced. Therefore, not only the sensor 23 that observes the observation point $R_1$ but also the N−1 sensors 23 that respectively observe the observation points $R_2$ to $R_N$ detect accelerations generated by the vehicle traveling on the lane $L_1$.

Figure 5:
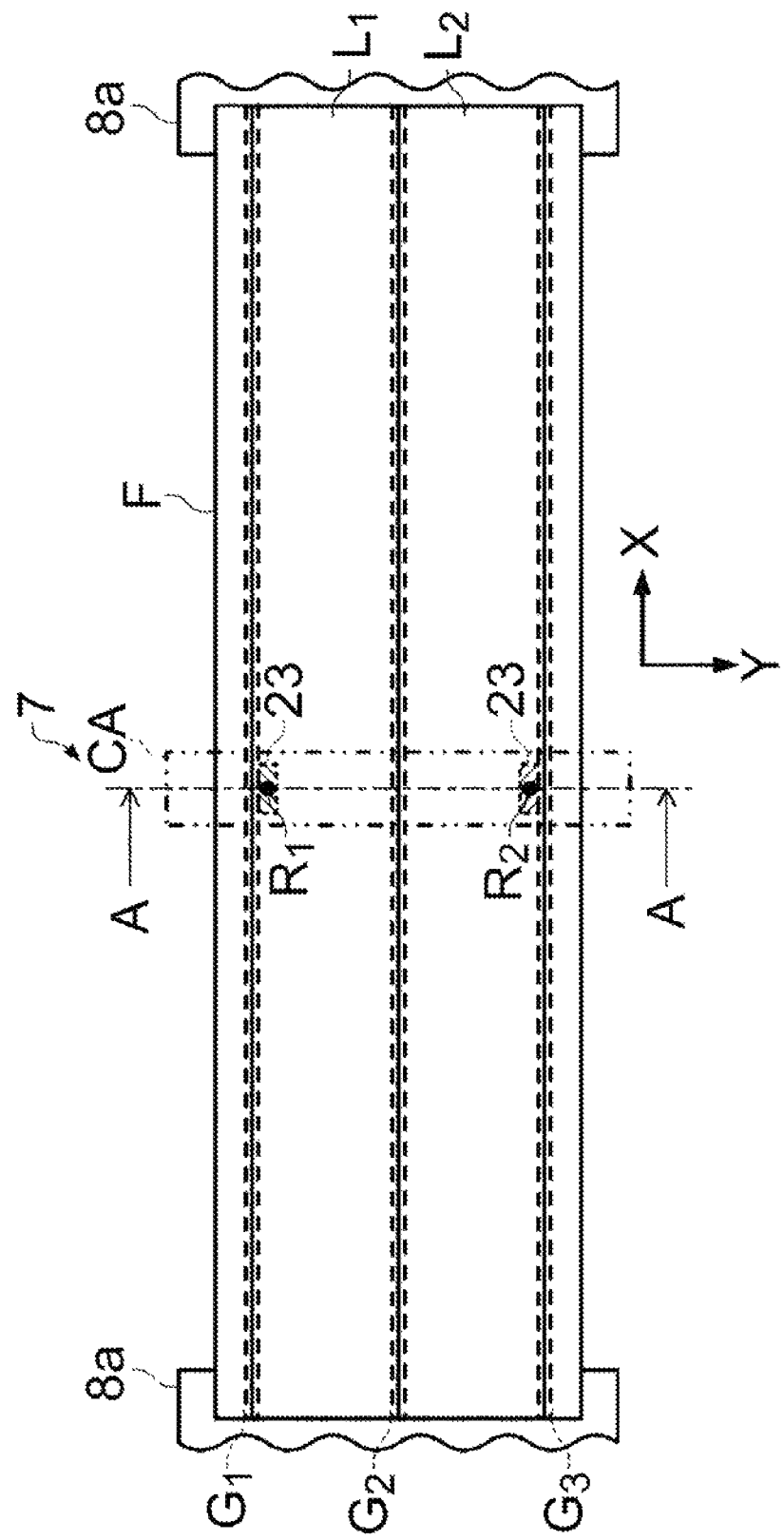
FIG. 5 is a diagram showing an arrangement example of the sensors and the observation points.
Figure 6:
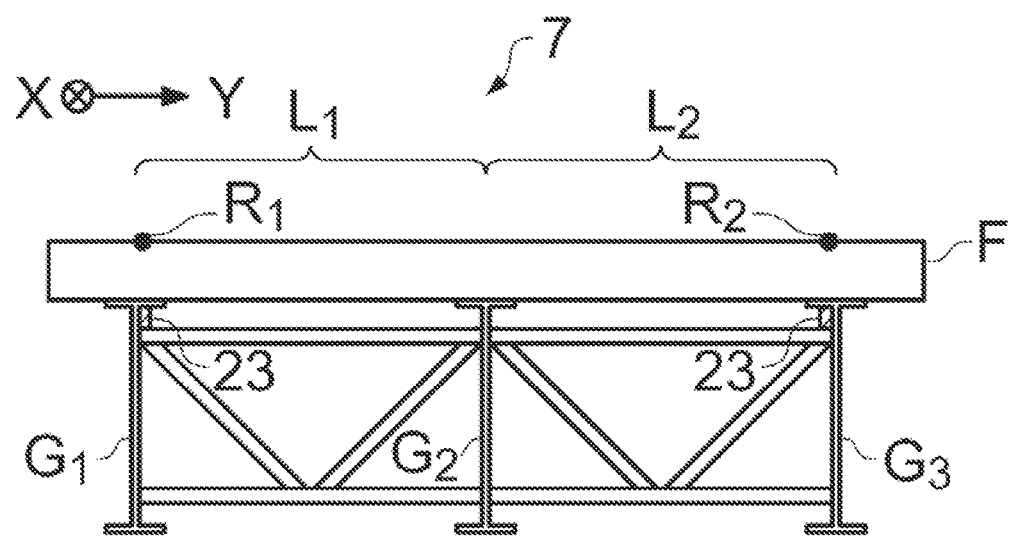
FIG. 6 is a diagram showing an arrangement example of the sensors and the observation points.
Figure 7:
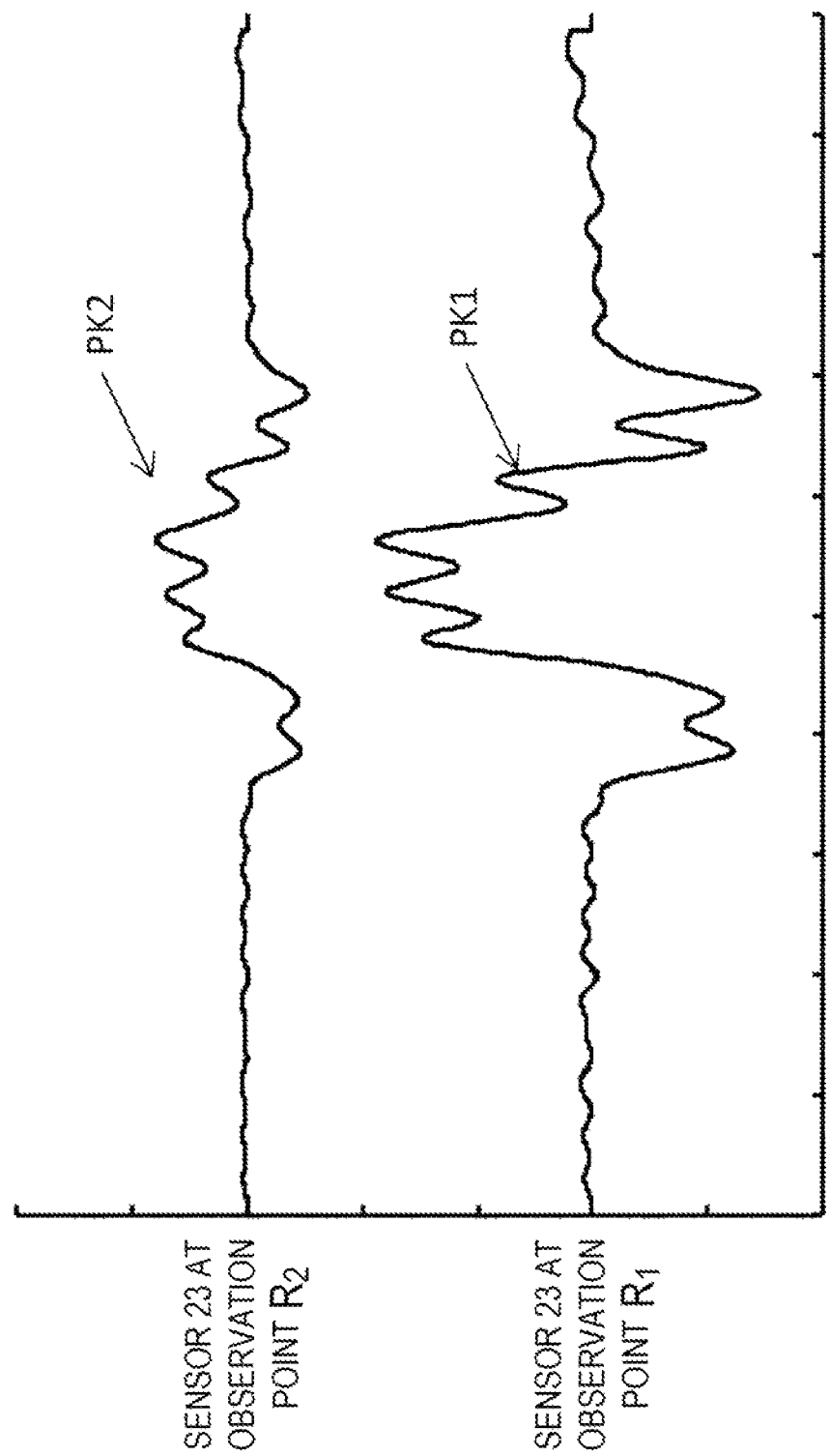
FIG. 7 is a diagram showing an example of an acceleration detected by each sensor.

As an example, FIGS. 5 and 6 show an arrangement example of the sensors 23 and the observation points $R_1$ and $R_2$ when N=2. FIG. 7 shows an example of the acceleration detected by each sensor 23 in the case of the arrangement example shown in FIGS. 5 and 6.

FIG. 5 is a diagram of the superstructure 7 as viewed from above. FIG. 6 is a cross-sectional view of FIG. 5 cut along a line A-A. In the example shown in FIGS. 5 and 6, two sensors 23 are provided on the main girders $G_1$ and $G_3$ at the central portion CA of the superstructure 7. The observation point $R_1$ corresponding to the lane $L_1$ is set at a position on the surface of the floor plate F in the vertically upward direction of the sensor 23 provided on the main girder $G_1$. The observation point $R_2$ corresponding to the lane $L_2$ is set at a position on the surface of the floor plate F in the vertically upward direction of the sensor 23 provided on the main girder $G_3$. The sensor 23 provided on the main girder $G_1$ observes the observation point $R_1$. The sensor 23 provided on the main girder $G_3$ observes the observation point $R_2$.

FIG. 7 is a diagram showing an example of the acceleration data output from each sensor 23 when the vehicle 6 travels alone on the lane $L_1$. Each waveform in FIG. 7 is a waveform obtained by performing filtering processing on each acceleration data in order to clarify a peak thereof.

A peak PK1 of the acceleration data output from the sensor 23 that observes the observation point $R_1$ indicates passage of an axle of the vehicle 6.

The peak PK1 of the acceleration data output from the sensor 23 that observes the observation point $R_1$ corresponds to the action $x_1$ on the observation point $R_1$ generated by the vehicle 6. On the other hand, a peak PK2 of the acceleration data output from the sensor 23 that observes the observation point $R_2$ corresponds to an action that the action $x_1$ on the observation point $R_1$ generated by the vehicle 6 has on the observation point $R_2$. The peak PK1 is greater than the peak PK2 since the vehicle 6 travels alone on the lane $L_1$.

When the vehicle 6 travels on the lane $L_1$ and the other vehicle 6 travels on the lane $L_2$ adjacently, the sensor 23 that observes the observation point $R_1$ detects an acceleration corresponding to a sum of the action $x_1$ on the observation point $R_1$ generated by the vehicle 6 traveling on the lane $L_1$ and an action that the action $x_2$ on the observation point $R_2$ generated by another vehicle 6 traveling on the lane $L_2$ has on the observation point $R_1$. Similarly, the sensor 23 that observes the observation point $R_2$ detects an acceleration corresponding to a sum of the action $x_2$ on the observation point $R_2$ generated by another vehicle 6 traveling on the lane $L_2$ and an action that the action $x_1$ on the observation point $R_1$ generated by the vehicle 6 traveling on the lane $L_1$ has on the observation point R2. Therefore, when two vehicles 6 travel adjacently, the peaks PK1 and PK2 are all greater than those in the example of FIG. 7. However, a magnitude relationship between the peak PK1 and the peak PK2 may not be changed. Moreover, since the magnitudes of the peaks PK1 and PK2 change depending on the weight of vehicle 6, a simple comparison of the peak PK1 and the peak PK2 does not make it possible to distinguish whether one vehicle 6 travels alone or two vehicles 6 travel adjacently.

On the other hand, when the vehicle 6 travels alone as in the example in FIG. 7, the waveforms of the accelerations detected by the sensors 23 are similar to each other although peaks thereof are different from each other. That is, for any integers j and i of 1 or more and N or less, there is a correlation between an action $x_j$ on the observation point $R_j$ when the vehicle 6 travels on the lane $L_j$ and an action that the action $x_j$ has on the observation point $R_1$. Therefore, in the present embodiment, using the correlation, the measurement device 1 calculates the actions $x_1$ to $x_N$, and calculates the displacement of the superstructure 7 due to the actions $x_1$ to $x_N$ and the load generated by the vehicles 6 traveling on the lanes $L_1$ to $L_N$.

First, a function $y_{ij}$ indicating the correlation between the action $x_j$ on the observation point R when the vehicle 6 travels on the lane $L_j$ and the action that the action $x_j$ on the observation point R has on the observation point $R_1$ is defined as in Equation (1). Each of j and i is any integer of 1 or more and N or less. In Equation (1), $a_{ij}$ is a first-order coefficient, and $b_{ij}$ is a zero-order coefficient. As shown in Equation (1), the function $y_{ij}$ is a polynomial function of action $x_j$, specifically a first-order polynomial function.

Figure 8:
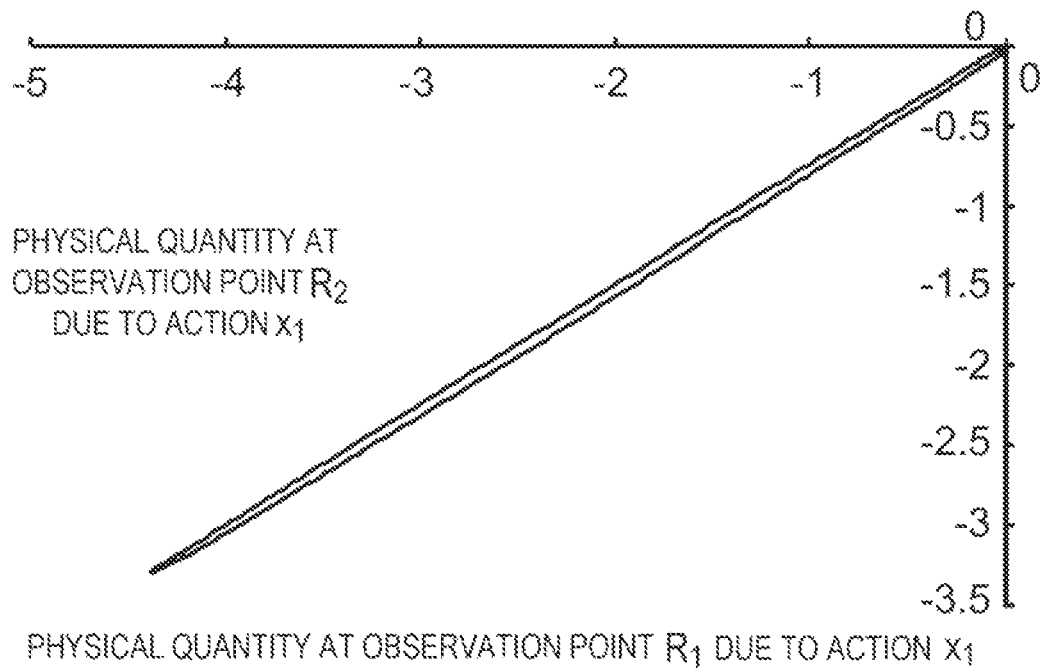
FIG. 8 is a diagram showing an example of a correlation between an action $x_1$ on an observation point $R_1$ and an action that the action $x_1$ has on an observation point $R_2$.

For example, as an example, the case of N=2 is taken as an example as in the arrangement example shown in FIGS. 5 and 6. When the vehicle 6 travels on the lane $L_1$, a correlation between a physical quantity observed when the action $x_1$ acts on the observation point $R_1$ of the lane $L_1$ and a physical quantity observed when the action $x_1$ of the lane $L_1$ acts on the observation point $R_2$ of the lane $L_2$ is represented by the first-order polynomial function as shown in FIG. 8.

$$y_{ij} = a_{ij}x_j + b_{ij} \qquad (1)$$

As an example, a function $y_{i1}$ indicating a correlation between the action $x_1$ on the observation point $R_1$ and an action that the action $x_1$ has on the observation point $R_i$ is defined as in Equation (2).

$$y_{i1} = a_{i1}x_1 + b_{i1} \qquad (1)$$

More specifically, functions $y_{i1}$ to $y_{N1}$ that indicate correlations between the action $x_1$ and actions that the action $x_1$ has on the observation points $R_1$ to $R_N$ are as shown in Equation (3), respectively.

$$\begin{aligned}
y_{11} &= a_{11}x_1 + b_{11} \\
y_{21} &= a_{21}x_1 + b_{21} \\
y_{31} &= a_{31}x_1 + b_{31} \\
&\vdots \\
y_{N1} &= a_{N1}x_1 + b_{N1}
\end{aligned} \qquad (3)$$

Next, as shown in Equation (4), a displacement $g_i$ at the observation point $R_1$ is assumed to be equal to a sum of values of the functions $y_{i1}$ to $y_{iN}$.

$$g_i = y_{i1} + y_{i2} + \ldots + y_{iN} \qquad (4)$$

At this time, according to Equations (1) and (4), a displacement vector $g$ having the displacements $g_1$ to $g_N$ at the observation points $R_1$ to $R_N$ as elements is expressed as Equation (5).

$$\vec{g} = \begin{pmatrix} g_1 \\ g_2 \\ g_3 \\ \vdots \\ g_N \end{pmatrix} \qquad (5)$$

$$= \begin{pmatrix} a_{11} & a_{12} & a_{13} & \cdots & a_{1N} \\ a_{21} & a_{22} & a_{23} & \cdots & a_{2N} \\ a_{31} & a_{32} & a_{33} & \cdots & a_{3N} \\ \vdots & \vdots & \vdots & \ddots & \vdots \\ a_{N1} & a_{N2} & a_{N3} & \cdots & a_{NN} \end{pmatrix} \begin{pmatrix} x_1 \\ x_2 \\ x_3 \\ \vdots \\ x_N \end{pmatrix} +$$

$$\begin{pmatrix} b_{11} & b_{12} & b_{13} & \cdots & b_{1N} \\ b_{21} & b_{22} & b_{23} & \cdots & b_{2N} \\ b_{31} & b_{32} & b_{33} & \cdots & b_{3N} \\ \vdots & \vdots & \vdots & \ddots & \vdots \\ b_{N1} & b_{N2} & b_{N3} & \cdots & b_{NN} \end{pmatrix} \begin{pmatrix} y_1 \\ y_2 \\ y_3 \\ \vdots \\ y_N \end{pmatrix}$$

$$= \underline{A} \cdot \vec{X} + \underline{B} \cdot \vec{Y}$$

In Equation (5), each element $y_k$ of a vector Y is defined as in Equation (6). k is any integer of 1 or more and N or less.

$$y_k = \begin{cases} 0 & (\text{if } x_k = 0) \\ 1 & (\text{if } x_k \neq 0) \end{cases} \qquad (6)$$

When it is assumed that a displacement vector u having actually observed displacements $u_1$ to $u_N$ at the observation points $R_1$ to $R_N$ as elements is equal to the displacement vector g, Equation (7) is obtained. The displacements $u_1$ to $u_N$ are obtained, for example, by integrating the accelerations detected by the N sensors 23 corresponding to the observation points $R_1$ to $R_N$ twice.

$$\vec{u} = \vec{g} = \underline{A} \cdot \vec{X} + \underline{B} \cdot \vec{Y} \qquad (7)$$

Equation (8) is obtained by transforming Equation (7)

$$\vec{X} = \begin{pmatrix} x_1 \\ x_2 \\ x_3 \\ \vdots \\ x_N \end{pmatrix} \qquad (8)$$

$$= A^{-1}(\vec{u} - B \cdot \vec{Y})$$

$$= \begin{pmatrix} a_{11} & a_{12} & a_{13} & \cdots & a_{1N} \\ a_{21} & a_{22} & a_{23} & \cdots & a_{2N} \\ a_{31} & a_{32} & a_{33} & \cdots & a_{3N} \\ \vdots & \vdots & \vdots & \ddots & \vdots \\ a_{N1} & a_{N2} & a_{N3} & \cdots & a_{NN} \end{pmatrix}^{-1}$$

$$\left\{ \begin{pmatrix} u_1 \\ u_2 \\ u_3 \\ \vdots \\ u_N \end{pmatrix} - \begin{pmatrix} b_{11} & b_{12} & b_{13} & \cdots & b_{1N} \\ b_{21} & b_{22} & b_{23} & \cdots & b_{2N} \\ b_{31} & b_{32} & b_{33} & \cdots & b_{3N} \\ \vdots & \vdots & \vdots & \ddots & \vdots \\ b_{N1} & b_{N2} & b_{N3} & \cdots & b_{NN} \end{pmatrix} \begin{pmatrix} y_1 \\ y_2 \\ y_3 \\ \vdots \\ y_N \end{pmatrix} \right\}$$

When a first-order coefficient matrix A and a zero-order coefficient matrix B are known, by substituting the displacement vector u obtained by the observation into Equation (8), an action vector X having unknown actions $x_1$ to $x_N$ as elements is calculated.

As an example, a process of deriving the actions $x_1$ and $x_2$ based on the Equation (8) will be described in detail by taking the case of N=2 as an example as in the arrangement example shown in FIGS. 5 and 6. Since N=2, Equation (9) is obtained based on Equation (8).

$$\begin{pmatrix} x_1 \\ x_2 \end{pmatrix} = \begin{pmatrix} a_{11} & a_{12} \\ a_{21} & a_{22} \end{pmatrix}^{-1} \left\{ \begin{pmatrix} u_1 \\ u_2 \end{pmatrix} - \begin{pmatrix} b_{11} & b_{12} \\ b_{21} & b_{22} \end{pmatrix} \begin{pmatrix} 1 \\ 1 \end{pmatrix} \right\} \qquad (9)$$

$$= \frac{1}{a_{11}a_{22} - a_{12}a_{21}} \begin{pmatrix} a_{22} & -a_{12} \\ -a_{21} & a_{11} \end{pmatrix} \left\{ \begin{pmatrix} u_1 \\ u_2 \end{pmatrix} - \begin{pmatrix} b_{11} & b_{12} \\ b_{21} & b_{22} \end{pmatrix} \begin{pmatrix} 1 \\ 1 \end{pmatrix} \right\}$$

Equation (10) is obtained by transforming Equation (9).

$$\begin{pmatrix} x_1 \\ x_2 \end{pmatrix} = \frac{1}{a_{11}a_{22} - a_{12}a_{21}} \begin{pmatrix} a_{22} & -a_{12} \\ -a_{21} & a_{11} \end{pmatrix} \left\{ \begin{pmatrix} u_1 \\ u_2 \end{pmatrix} - \begin{pmatrix} b_{11} + b_{12} \\ b_{21} + b_{22} \end{pmatrix} \right\} \qquad (10)$$

According to Equation (10), the actions $x_1$ and $x_2$ are calculated as in Equations (11) and (12), respectively.

$$x_1 = \frac{a_{22}(u_1 - b_{11} - b_{12}) + a_{12}(-u_2 + b_{21} + b_{22})}{a_{11}a_{22} - a_{12}a_{21}} \quad (11)$$

$$x_2 = \frac{a_{21}(-u_1 + b_{11} + b_{12}) + a_{11}(u_2 - b_{21} - b_{22})}{a_{11}a_{22} - a_{12}a_{21}} \quad (12)$$

Figure 9:
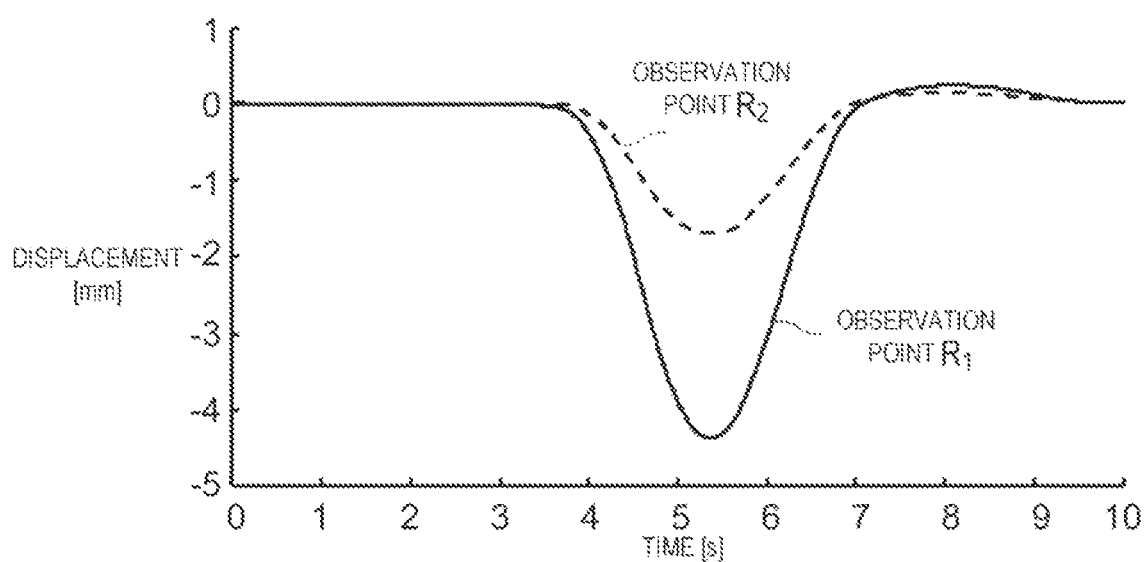
FIG. 9 is a diagram showing an example of displacements at observation points when a vehicle travels alone.
Figure 10:
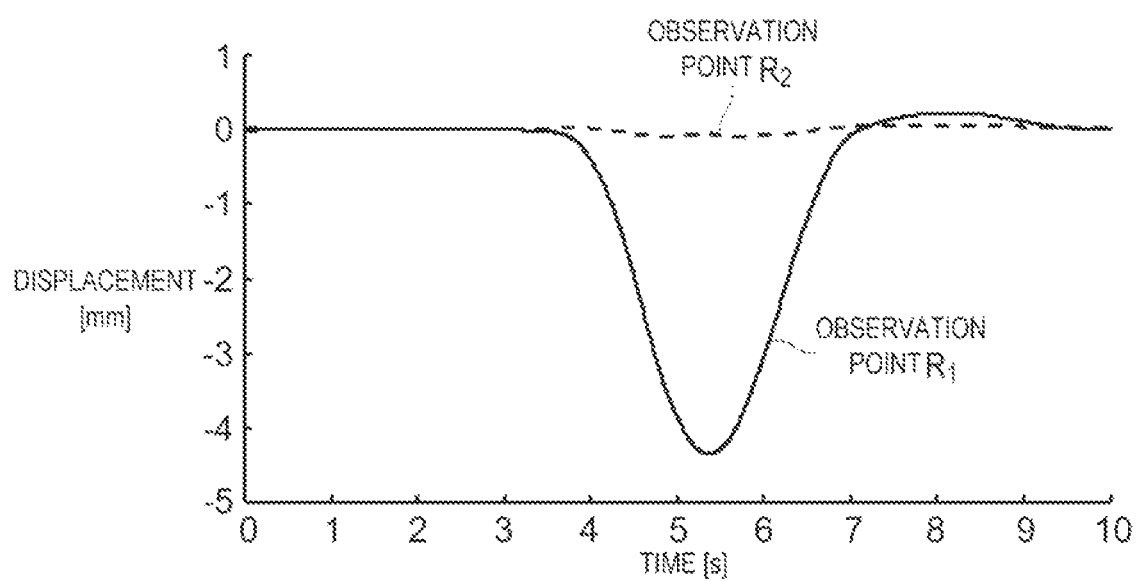
FIG. 10 is a diagram showing an example of the displacements at the observation points calculated based on the action with respect to FIG. 9.

FIG. 9 shows an example of the displacements at the observation points $R_1$ and $R_2$ observed when the vehicle 6 travels alone on the lane $L_1$ in the case of the arrangement example shown in FIGS. 5 and 6. FIG. 10 is a diagram showing an example of the displacements at the observation points $R_1$ and $R_2$ calculated based on the actions $x_1$ and $x_2$ obtained by the Equations (11) and (12), with respect to the displacements at the observation points $R_1$ and $R_2$ shown in FIG. 9. In FIGS. 9 and 10, the horizontal axis represents the time and the vertical axis represents the displacement. A solid line shows the displacement at the observation point $R_1$ and a broken line shows the displacement at the observation point $R_2$.

As shown in FIG. 9, since the vehicle 6 travels alone on the lane $L_1$, the displacement at the observation point $R_1$ is greater than the displacement at the observation point $R_2$. Although there is no vehicle traveling on the lane $L_2$, the displacement at the observation point $R_2$ is not zero due to the action that the action $x_1$ has on the observation point $R_2$. Then, a time point when the displacement at the observation point $R_1$ is maximum and a time point when the displacement at the observation point $R_2$ is maximum coincide with each other. In contrast, as shown in FIG. 10, the displacement at the observation point $R_1$ calculated based on the action $x_1$ is substantially the same as the displacement at the observation point $R_1$ shown in FIG. 9, and the displacement at the observation point $R_2$ calculated based on the action $x_2$ is zero. Then, since the displacement at the observation point $R_1$ shown in FIG. 10 has a peak while the displacement at the observation point $R_2$ has no peak, it is possible to identify that the vehicle 6 travels alone on the lane $L_1$ and to calculate, based on the displacement at the observation point $R_1$ due to the action $x_1$, the load generated by the vehicle 6.

Figure 11:
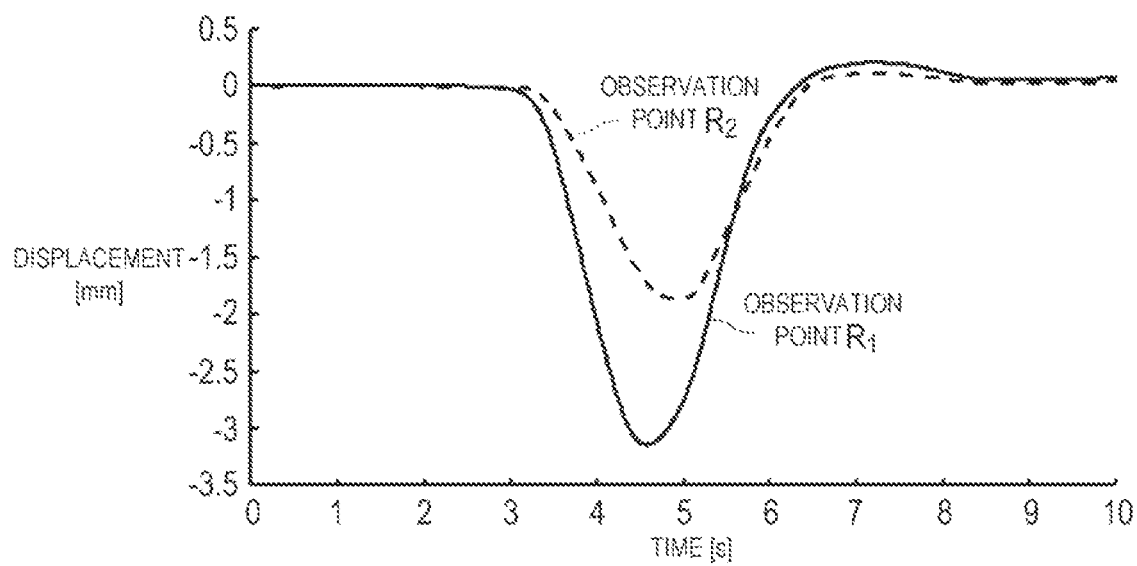
FIG. 11 is a diagram showing an example of displacements at the observation points when two vehicles travel adjacently.
Figure 12:
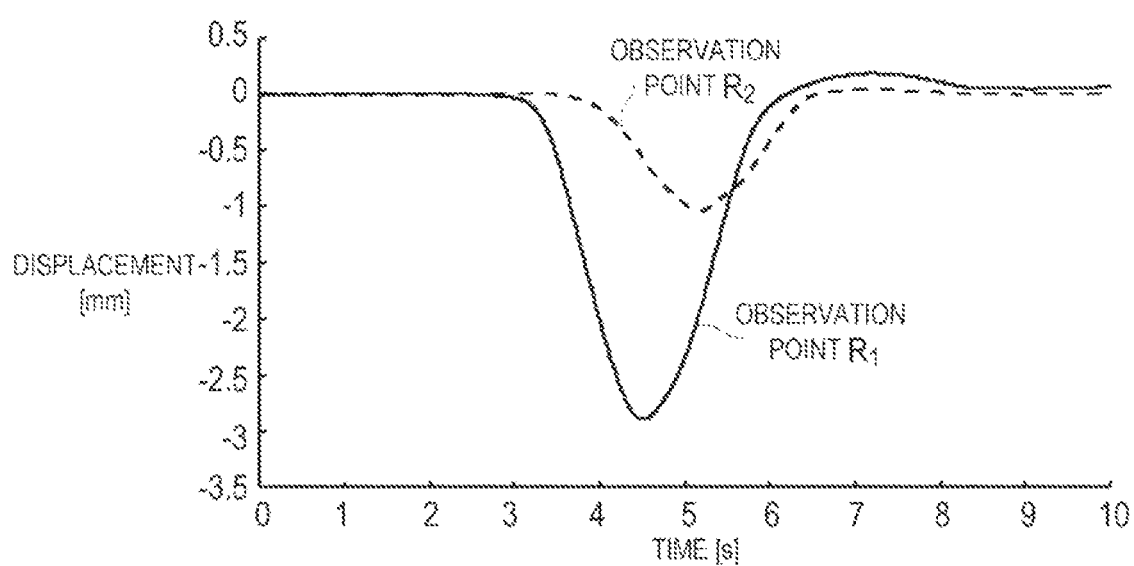
FIG. 12 is a diagram showing an example of the displacements at the observation points calculated based on the action with respect to FIG. 11.

In contrast, FIG. 11 shows an example of the displacements at the observation points $R_1$ and $R_2$ observed when two different vehicles 6 travel adjacently on the lanes $L_1$ and $L_2$ in the case of the arrangement example shown in FIGS. 5 and 6. FIG. 12 is a diagram showing an example of the displacements at the observation points $R_1$ and $R_2$ calculated based on the actions $x_1$ and $x_2$, which are obtained according to Equations (11) and (12) based on the displacements at the observation points $R_1$ and $R_2$ shown in FIG. 11. In FIGS. 11 and 12, horizontal axes represent the time, and vertical axes represent the displacement. A solid line shows the displacement at the observation point $R_1$ and a broken line shows the displacement at the observation point $R_2$.

As shown in FIG. 11, since the two vehicles 6 travel adjacently on the lanes $L_1$ and $L_2$, the displacement at the observation point $R_1$ is a displacement corresponding to the sum of the action $x_1$ caused by the load of one vehicle 6 traveling on the lane $L_1$ and the action that the action $x_2$ caused by the load of the other vehicle 6 traveling on the lane $L_2$ has on the observation point $R_1$. Similarly, the displacement at the observation point $R_2$ is a displacement corresponding to the sum of the action $x_2$ and the action that the action $x_1$ has on the observation point $R_2$. Then, since the time point when the two vehicles 6 travel on the lanes $L_1$ and $L_2$ are different, the time point when the displacement at the observation point $R_1$ is maximum and the time point when the displacement at the observation point $R_2$ is maximum do not coincide. In contrast, as shown in FIG. 12, the maximum displacement at the observation point $R_1$ calculated based on the action $x_1$ is smaller than the maximum displacement at the observation point $R_1$ shown in FIG. 11. The maximum displacement at the observation point $R_2$ calculated based on the action $x_2$ is smaller than the maximum displacement at the observation point $R_2$ shown in FIG. 11. Then, since the displacements at the observation points $R_1$ and $R_2$ shown in FIG. 12 both have peaks, it is possible to identify that the two vehicles 6 travel on the lanes $L_1$ and $L_2$ adjacently, and to calculate, based on the displacements at the observation points $R_1$ and $R_2$, the load on the lane $L_1$ generated by the vehicle 6 traveling on lane $L_1$ and the load on the lane $L_2$ generated by the vehicle 6 traveling on the lane $L_2$.

1-3. Measurement Method

Figure 13:
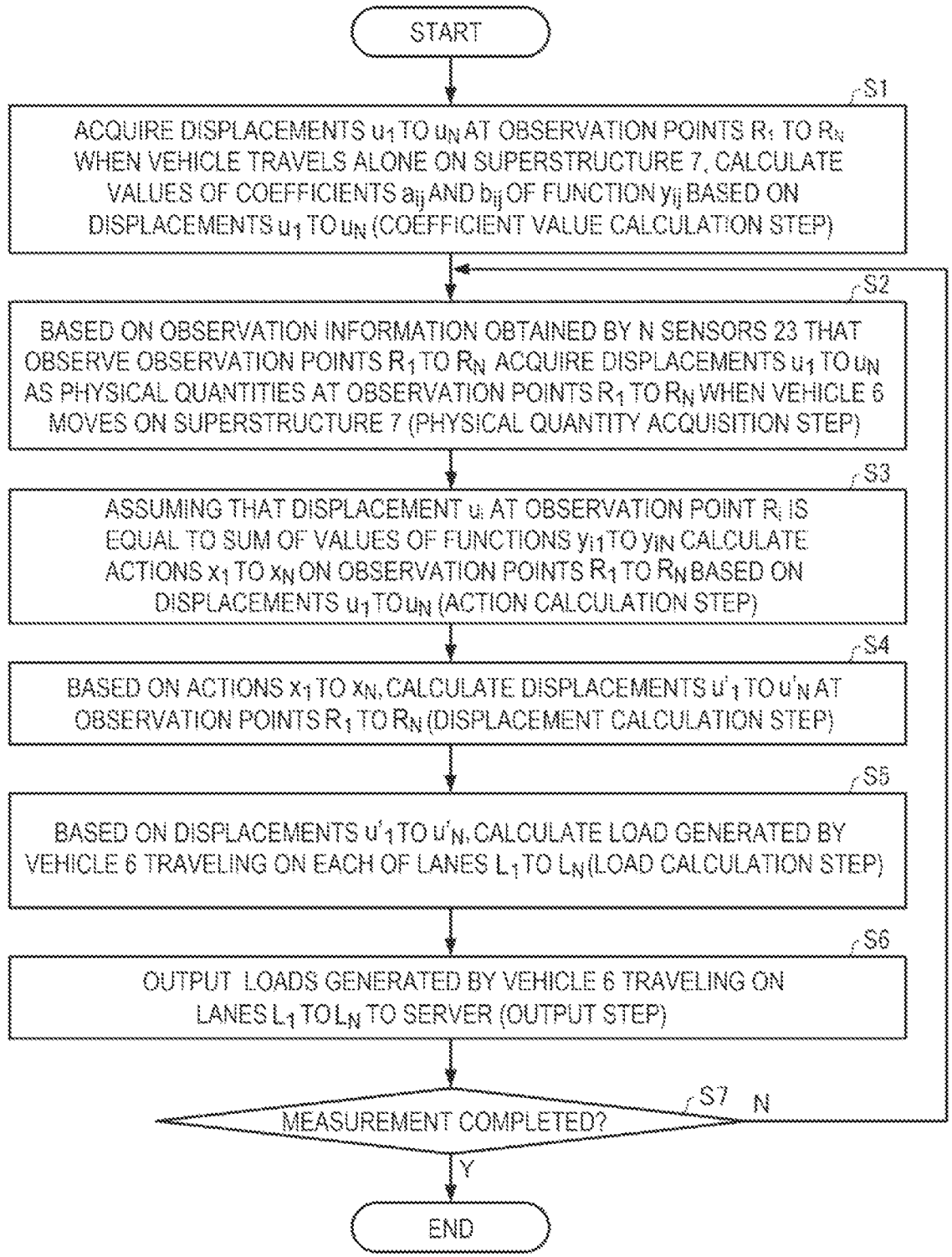
FIG. 13 is a flowchart showing an example of a procedure of a measurement method according to a first embodiment.

FIG. 13 is a flowchart showing an example of a procedure of the measurement method according to the first embodiment. In the present embodiment, the measurement device 1 executes the procedure shown in FIG. 13.

As shown in FIG. 13, first, the measurement device 1 acquires the displacements $u_1$ to $u_N$ at the observation points $R_1$ to $R_N$ when the vehicle travels alone on the superstructure 7, and calculates, based on the displacements $u_1$ to $u_N$, values of the coefficients $a_{ij}$ and $b_{ij}$ of the function $y_{ij}$ (step S1). i and j are any integers of 1 or more and N or less. The vehicle is a known moving object different from the vehicle 6 which is an unknown moving object. The known moving object is a moving object for which information such as the load, the dimension, and the number of axles is known. The unknown moving object is a moving object for which the information is not known. Specifically, the measurement device 1 calculates an inverse matrix $A^{-1}$ of the first-order coefficient matrix A and the zero-order coefficient matrix B included in the above Equation (8). The step S1 is a coefficient value calculation step.

Next, based on observation information obtained by the N sensors 23 that observe the observation points $R_1$ to $R_N$, the measurement device 1 acquires the displacements $u_1$ to $u_N$ as physical quantities at the observation points $R_1$ to $R_N$ when the vehicle 6 moves on the superstructure 7 (step S2). As described above, the N sensors 23 are acceleration sensors. The observation information obtained by the N sensors 23 is detection information on the accelerations generated at the observation points $R_1$ to $R_N$. Then, the acceleration is an acceleration in the third direction which intersects the X direction, which is the first direction, and the Y direction, which is the second direction. The measurement device 1 integrates the acceleration in the third direction detected by each of the N sensors 23 twice to calculate the displacement vector u included in the above Equation (8). Therefore, the displacements $u_1$ to $u_N$ as the physical quantities at the observation points $R_1$ to $R_N$ acquired by the measurement device 1 in a physical quantity acquisition step are displacements in the third direction intersecting the X and Y directions, respectively, for example, displacements in the third direction that is orthogonal to the X and Y directions, respectively. The step S2 is the physical quantity acquisition step.

Next, the measurement device 1 calculates the actions $x_1$ to $x_N$ on the observation points $R_1$ to $R_N$ based on the displacements $u_1$ to $u_N$ acquired in step S2, on the assumption that the displacement $u_1$ at the observation point $R_1$ is equal to the sum of the values of the functions $y_{i1}$ to $y_{iN}$ (step S3). i is any integer of 1 or more and N or less. Specifically, the measurement device 1 calculates the action vector X by substituting the inverse matrix $A^{-1}$ of the first-order coefficient matrix A and the zero-order coefficient matrix B which are calculated in step S1 and the displacement vector u calculated in step S2 into the above Equation (8). The step S3 is an action calculation step.

Next, based on the actions $x_1$ to $x_N$ calculated in step S3, the measurement device 1 calculates displacements $u'_1$ to $u'_N$ at the observation points $R_1$ to $R_N$ (step S4). For example, for each integer j of 1 or more and N or less, a displacement $g_j$ calculated assuming that all actions among the actions $x_1$ to $x_N$ except the action $x_j$ in the right-hand side of the above Equation (5) are zero is defined as a displacement $u'_j$. The step S4 is a displacement calculation step.

Next, based on the displacements $u'_1$ to $u'_N$ calculated in step S4, the measurement device 1 calculates the load generated by the vehicle 6 traveling on each of the lanes $L_1$ to $L_N$ (step S5). For each integer j of 1 or more and N or less, since there is a correlation between the displacement $u'_j$ and the load generated by the vehicle 6 traveling on the lane $L_j$, a coefficient of a correlation equation is calculated in advance in a load test of a vehicle. The measurement device 1 can calculate the load generated by the vehicle 6 traveling on the lane $L_j$ by substituting the displacement $u'_j$ into the correlation equation. The step S5 is a load calculation step.

Next, the measurement device 1 outputs the loads generated by the vehicle 6 traveling on the lanes $L_1$ to $L_N$ calculated in step S5 to the server 2 (step S6). The step S6 is an output step.

The measurement device 1 repeats the processing in steps S2 to S6 until the measurement is completed (Y in step S7).

Figure 14:
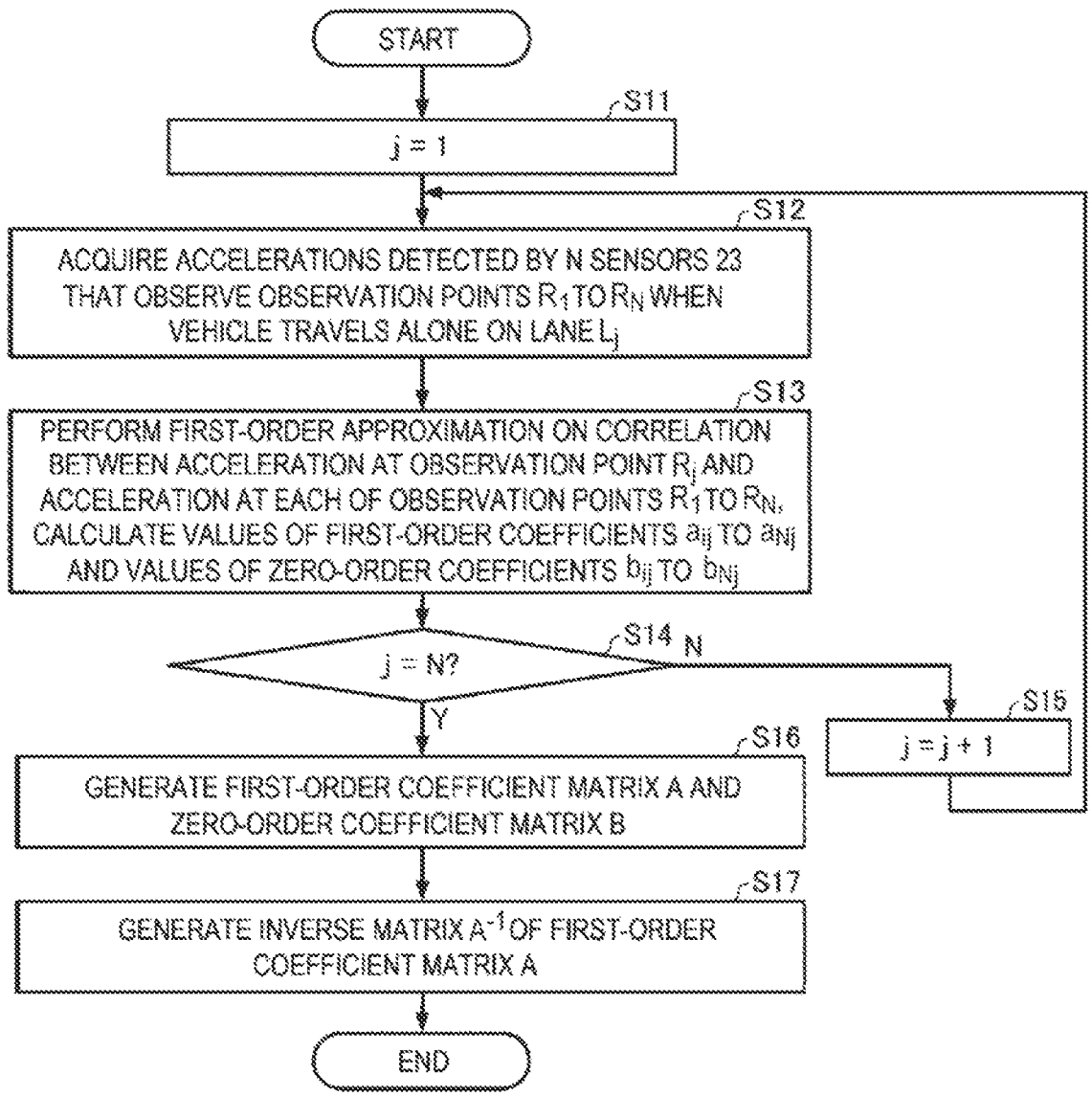
FIG. 14 is a flowchart showing an example of a procedure of a coefficient value calculation step.

FIG. 14 is a flowchart showing an example of a procedure of the coefficient value calculation step, which is step S1 in FIG. 13.

As shown in FIG. 14, first, the measurement device sets an integer j to 1 (step S11), and acquires accelerations detected by the N sensors 23 that observe the observation points $R_1$ to $R_N$ when the vehicle travels alone on the lane $L_j$ (step S12).

Next, the measurement device 1 performs first-order approximation on a correlation between the acceleration at the observation point $R_j$ and the acceleration at each of the observation points $R_1$ to $R_N$ acquired in step S12, and calculates values of first-order coefficients $a_{1j}$ to $a_{Nj}$ and values of zero-order coefficients $b_{ij}$ to $b_{Nj}$ (step S13).

When the integer j is not N (N in step S14), the measurement device 1 adds 1 to the integer j (step S15), and repeats the processing in steps S11 to S13.

Then, when the integer j is N (Y in step S14), the measurement device 1 generates the first-order coefficient matrix A having the first-order coefficients $a_{11}$ to $a_{NN}$ calculated in step S13 as elements and the zero-order coefficient matrix B having the zero-order coefficients $b_{11}$ to $b_{NN}$ calculated in step S13 as elements (step S16). The first-order coefficient matrix A and the zero-order coefficient matrix B are matrices included in the above Equation (5).

Finally, the measurement device 1 generates the inverse matrix $A^{-1}$ of the first-order coefficient matrix A (step S17), and ends the processing of the coefficient value calculation step.

1-4. Configuration of Measurement Device

Figure 15:
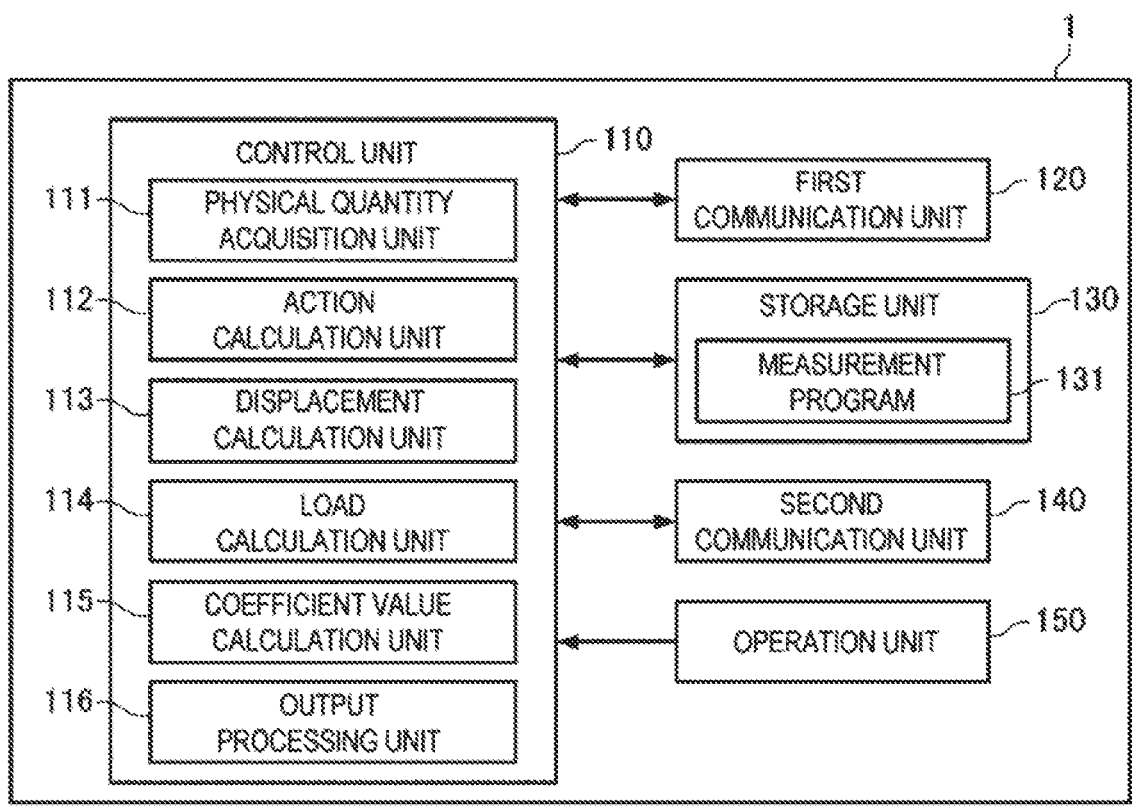
FIG. 15 is a diagram showing a configuration example of a measurement device.

FIG. 15 is a diagram showing a configuration example of the measurement device 1 according to the present embodiment. As shown in FIG. 15, the measurement device 1 includes a control unit 110, a first communication unit 120, a storage unit 130, a second communication unit 140, and an operation unit 150.

The control unit 110 calculates the displacement or the like of the superstructure 7 based on the acceleration data output from each of the sensors 23 installed in the superstructure 7.

The first communication unit 120 receives the acceleration data from each of the sensors 23. The acceleration data output from each of the sensors 23 is, for example, a digital signal. The first communication unit 120 outputs, to the control unit 110, the acceleration data received from each of the sensors 23.

The storage unit 130 is a memory that stores a program, data, and the like for the control unit 110 to perform calculation processing and control processing. In addition, the storage unit 130 stores a program, data, and the like for the control unit 110 to implement a predetermined application function. The storage unit 130 is implemented by, for example, various integrated circuit (IC) memories such as a read only memory (ROM), a flash ROM, and a random access memory (RAM), and a recording medium such as a hard disk and a memory card.

The storage unit 130 includes a non-volatile information storage device that is a device or a medium that can be read by a computer. Various programs, data, and the like may be stored in the information storage device. The information storage device may be an optical disk such as an optical disk DVD or a CD, a hard disk drive, or various types of memories such as a card-type memory or a ROM. In addition, the control unit 110 may receive various programs, data, and the like via the communication network 4 and store the programs, the data, and the like in the storage unit 130.

The second communication unit 140 transmits information such as a calculation result of the control unit 110 to the server 2 via the communication network 4.

The operation unit 150 acquires operation data from the user and transmits the operation data to the control unit 110.

The control unit 110 includes a physical quantity acquisition unit 111, an action calculation unit 112, a displacement calculation unit 113, a load calculation unit 114, a coefficient value calculation unit 115, and an output processing unit 116.

Based on the observation information obtained by the N sensors 23 that observe the observation points $R_1$ to $R_N$, the physical quantity acquisition unit 111 acquires the displacements $u_1$ to $u_N$ as the physical quantities at the observation points $R_1$ to $R_N$ when the vehicle 6 moves on the superstructure 7. That is, the physical quantity acquisition unit 111 performs the processing of the physical quantity acquisition step in FIG. 13. The displacements $u_1$ to $u_N$ acquired by the physical quantity acquisition unit 111 are stored in the storage unit 130.

The action calculation unit 112 calculates the actions $x_1$ to $x_N$ on the observation points $R_1$ to $R_N$ based on the displacements $u_1$ to $u_N$ acquired by the physical quantity acquisition unit 111, on the assumption that the displacement $u_1$ at the observation point $R_1$ is equal to the sum of the values of the functions $y_{i1}$ to $y_{iN}$ for any integer i of 1 or more and N or less. That is, the action calculation unit 112 performs the processing of the action calculation step in FIG. 13. The actions $x_1$ to $x_N$ calculated by the action calculation unit 112 are stored in the storage unit 130.

Based on the actions $x_1$ to $x_N$ calculated by the action calculation unit 112, the displacement calculation unit 113 calculates the displacements $u'_1$ to $u'_N$ at the observation points $R_1$ to $R_N$. That is, the displacement calculation unit 113 performs the processing of the displacement calculation step in FIG. 13. The displacements $u'_1$ to $u'_N$ calculated by the displacement calculation unit 113 are stored in the storage unit 130.

Based on the displacements $u'_1$ to $u'_N$ calculated by the displacement calculation unit 113, the load calculation unit 114 calculates the load generated by the vehicle 6 traveling on each of the lanes $L_1$ to $L_N$. That is, the load calculation unit 114 performs the processing of the load calculation step in FIG. 13. The load generated by the vehicle 6 traveling on each of the lanes $L_1$ to $L_N$ and calculated by the load calculation unit 114 is stored in the storage unit 130.

For any integers i and j of 1 or more and N or less, the coefficient value calculation unit 115 acquires the displacements $u_1$ to $u_N$ at the observation points $R_1$ to $R_N$ when the vehicle travels alone on the superstructure 7, and calculates, based on the displacements $u_1$ to $u_N$, the values of the coefficients $a_{ij}$ and $b_{ij}$ of the function $y_{ij}$. That is, the coefficient value calculation unit 115 performs the processing of the coefficient value calculation step in FIG. 13. The values of the first-order coefficients $a_{11}$ to $a_{NN}$ and the values of the zero-order coefficients $b_{11}$ to $b_{NN}$ calculated by the coefficient value calculation unit 115 are stored in the storage unit 130.

The output processing unit 116 performs processing of outputting the loads of the vehicle 6 traveling on the lanes $L_1$ to $L_N$ calculated by the load calculation unit 114 to the server 2 via the second communication unit 140. That is, the output processing unit 116 performs the processing of the output step in FIG. 13.

For example, based on the operation data from the operation unit 150, the control unit 110 switches between a first mode for calculating the displacement of the superstructure 7 generated by the unknown vehicle 6, and a second mode for calculating the first-order coefficients $a_{11}$ to $a_{NN}$ and the zero-order coefficients $b_{11}$ to $b_{NN}$. For example, after the N sensors 23 are installed in the superstructure 7, a load test of a plurality of vehicles is performed in a state in which the control unit 110 is set to the second mode. After the load test ends, the control unit 110 is set to the first mode.

In the present embodiment, the control unit 110 is a processor that executes various programs stored in the storage unit 130. By executing a measurement program 131 stored in the storage unit 130, functions of the physical quantity acquisition unit 111, the action calculation unit 112, the displacement calculation unit 113, the load calculation unit 114, the coefficient value calculation unit 115, and the output processing unit 116 are implemented. In other words, the measurement program 131 is a program that causes the measurement device 1, which is a computer, to execute each procedure in the flowchart shown in FIG. 13.

In the processor, for example, a function of each part may be implemented by individual hardware, or the functions of the respective parts may be implemented by integrated hardware. For example, the processor may include hardware. The hardware may include at least one of a circuit for processing the digital signal and a circuit for processing an analog signal. The processor may be a central processing unit (CPU), a graphics processing unit (GPU), a digital signal processor (DSP), or the like. The control unit 110 is implemented as a custom integrated circuit (IC) such as an application specific integrated circuit (ASIC), and may implement the function of each part, or may implement the function of each part by the CPU and the ASIC.

The control unit 110 may not include the load calculation unit 114. The control unit 110 may not include the coefficient value calculation unit 115. For example, the server 2 or another device may perform processing of calculating the values of the first-order coefficients $a_{11}$ to $a_{NN}$ and the values of the zero-order coefficients $b_{11}$ to $b_{NN}$, and store the values in the storage unit 130 of the measurement device 1.

1-5. Operation Effects

In the measurement method according to the first embodiment described above, based on the observation information obtained by the N sensors 23 that observe the observation points $R_1$ to $R_N$, the measurement device 1 acquires the displacements $u_1$ to $u_N$ as the physical quantities at the observation points $R_1$ to $R_N$. Then, on the assumption that, when a function indicating a correlation between the action $x_j$ on the observation point $R_j$ and the action that the action $x_j$ has on the observation point $R_i$ is set as $y_{ij}$, the displacement $u_i$ is equal to the sum of the values of the functions $y_{i1}$ to $y_{iN}$, the measurement device 1 calculates the actions $x_1$ to $x_N$ on the observation points $R_1$ to $R_N$ according to Equation (8) and based on the displacements $u_1$ to $u_N$. Therefore, according to the measurement method in the first embodiment, the measurement device 1 can calculate the action $x_j$ when the vehicle 6, which is a moving object, passes the observation point $R_j$ of the superstructure 7, which is a structure, separately from other actions. For example, even when a plurality of vehicles 6 travel adjacently on a plurality of lanes, the measurement device 1 can calculate the action $x_j$ on the observation point $R_j$ generated by the vehicle 6 traveling on the lane L by excluding the influence of the action on the observation point $R_j$ that the action $x_i$ on the observation point $R_i$ generated by the vehicle 6 traveling on the lane $L_i$ has.

In the measurement method according to the first embodiment, the measurement device 1 calculates the displacements $u'_1$ to $u'_N$ at the observation points $R_1$ to $R_N$ based on the actions $x_1$ to $x_N$ on the observation points $R_1$ to $R_N$, and calculates the loads generated by the vehicle 6 at the observation points $R_1$ to $R_N$ based on the displacements $u'_1$ to $u'_N$. Therefore, according to the measurement method in the first embodiment, the measurement device 1 can accurately calculate, based on the action $x_j$ on the observation point $R_j$ which is calculated separately from other actions, the displacement and the load at the observation point $R_j$ generated by the traveling of the vehicle 6. For example, even when a plurality of vehicles travel adjacently on the plurality of lanes, the measurement device 1 can accurately calculate the displacement and the load at the lane $L_j$ generated by the vehicle 6 moving along the lane $L_j$. Based on the information on the displacement and the load, for example, the measurement device 1 or the server 2 can accurately perform processing such as monitoring of an overloaded vehicle and abnormality determination of the superstructure 7.

According to the measurement method in the first embodiment, since the measurement device 1 can calculate the displacement of the superstructure 7 caused by the axle load of the vehicle 6 passing through the superstructure 7 and the load of the vehicle 6, sufficient information can be provided for maintenance and management of the bridge 5 to predict the damage of the superstructure 7.

2. Second Embodiment

In the measurement method according to the first embodiment, in the physical quantity acquisition step, the measurement device 1 acquires the displacements $u_1$ to $u_N$ at the observation points $R_1$ to $R_N$ as the physical quantities at the observation points $R_1$ to $R_N$. Meanwhile, in a measurement method according to a second embodiment, in a physical quantity acquisition step, the measurement device 1 acquires loads $w_1$ to $w_N$ at the observation points $R_1$ to $R_N$ generated by the vehicle 6 as the physical quantities at the observation points $R_1$ to $R_N$. Hereinafter, the same components as those in the first embodiment will be denoted by the same reference numerals for the second embodiment, and the description repeated with that in the first embodiment will be omitted or simplified, and different contents from those of the first embodiment will be mainly described.

As shown in Equation (13), a load $f_i$ at the observation point $R_1$ generated by the vehicle 6 is assumed to be equal to a sum of the values of the above described functions $y_{i1}$ to $y_{iN}$.

$$f_i = y_{i1} + y_{i2} + \ldots + y_{iN} \qquad (13)$$

At this time, according to Equations (1) and (13), a load vector f having loads $f_1$ to $f_N$ at the observation points $R_1$ to $R_N$ generated by the vehicle 6 as elements is expressed as Equation (14).

$$\vec{f} = \begin{pmatrix} f_1 \\ f_2 \\ f_3 \\ \vdots \\ f_N \end{pmatrix} \qquad (14)$$

$$= \begin{pmatrix} a_{11} & a_{12} & a_{13} & \ldots & a_{1N} \\ a_{21} & a_{22} & a_{23} & \ldots & a_{2N} \\ a_{31} & a_{32} & a_{33} & \ldots & a_{3N} \\ \vdots & \vdots & \vdots & \ddots & \vdots \\ a_{N1} & a_{N2} & a_{N3} & \ldots & a_{NN} \end{pmatrix} \begin{pmatrix} x_1 \\ x_2 \\ x_3 \\ \vdots \\ x_N \end{pmatrix} + \begin{pmatrix} b_{11} & b_{12} & b_{13} & \ldots & b_{1N} \\ b_{21} & b_{22} & b_{23} & \ldots & b_{2N} \\ b_{31} & b_{32} & b_{33} & \ldots & b_{3N} \\ \vdots & \vdots & \vdots & \ddots & \vdots \\ b_{N1} & b_{N2} & b_{N3} & \ldots & b_{NN} \end{pmatrix} \begin{pmatrix} y_1 \\ y_2 \\ y_3 \\ \vdots \\ y_N \end{pmatrix}$$

$$= \underline{A} \cdot \vec{X} + \underline{B} \cdot \vec{Y}$$

In Equation (14), each element $y_k$ of a vector Y is defined as in Equation (15). k is any integer of 1 or more and N or less.

$$y_k = \begin{cases} 0 & (\text{if } x_k = 0) \\ 1 & (\text{if } x_k \neq 0) \end{cases} \qquad (15)$$

When it is assumed that a load vector w having the actually observed loads $w_1$ to $w_N$ at the observation points $R_1$ to $R_N$ generated by the vehicles 6 as elements is equal to the load vector f, Equation (16) is obtained.

$$\vec{w} = \vec{f} = \underline{A} \cdot \vec{X} + \underline{B} \cdot \vec{Y} \qquad (16)$$

Equation (17) is obtained by transforming Equation (16).

$$\vec{X} = \begin{pmatrix} x_1 \\ x_2 \\ x_3 \\ \vdots \\ x_N \end{pmatrix} \qquad (17)$$

$$= \underline{A}^{-1} (\vec{w} - \underline{B} \cdot \vec{Y})$$

$$= \begin{pmatrix} a_{11} & a_{12} & a_{13} & \ldots & a_{1N} \\ a_{21} & a_{22} & a_{23} & \ldots & a_{2N} \\ a_{31} & a_{32} & a_{33} & \ldots & a_{3N} \\ \vdots & \vdots & \vdots & \ddots & \vdots \\ a_{N1} & a_{N2} & a_{N3} & \ldots & a_{NN} \end{pmatrix}^{-1}$$

$$\left\{ \begin{pmatrix} w_1 \\ w_2 \\ w_3 \\ \vdots \\ w_N \end{pmatrix} - \begin{pmatrix} b_{11} & b_{12} & b_{13} & \ldots & b_{1N} \\ b_{21} & b_{22} & b_{23} & \ldots & b_{2N} \\ b_{31} & b_{32} & b_{33} & \ldots & b_{3N} \\ \vdots & \vdots & \vdots & \ddots & \vdots \\ b_{N1} & b_{N2} & b_{N3} & \ldots & b_{NN} \end{pmatrix} \begin{pmatrix} y_1 \\ y_2 \\ y_3 \\ \vdots \\ y_N \end{pmatrix} \right\}$$

When a first-order coefficient matrix A and a zero-order coefficient matrix B are known, by substituting the load vector w obtained by the observation into Equation (17), an action vector X having unknown actions $x_1$ to $x_N$ as elements is calculated.

As an example, a process of deriving the actions $x_1$ and $x_2$ based on Equation (17) will be described in detail by taking the case of N=2 as an example as in the above-described arrangement example shown in FIGS. 5 and 6. Since N=2, Equation (18) is obtained based on Equation (17).

$$\begin{pmatrix} x_1 \\ x_2 \end{pmatrix} = \begin{pmatrix} a_{11} & a_{12} \\ a_{21} & a_{22} \end{pmatrix}^{-1} \left\{ \begin{pmatrix} w_1 \\ w_2 \end{pmatrix} - \begin{pmatrix} b_{11} & b_{12} \\ b_{21} & b_{22} \end{pmatrix} \begin{pmatrix} 1 \\ 1 \end{pmatrix} \right\} \qquad (18)$$

$$= \frac{1}{a_{11}a_{22} - a_{12}a_{21}} \begin{pmatrix} a_{22} & -a_{12} \\ -a_{21} & a_{11} \end{pmatrix} \left\{ \begin{pmatrix} u_1 \\ u_2 \end{pmatrix} - \begin{pmatrix} b_{11} & b_{12} \\ b_{21} & b_{22} \end{pmatrix} \begin{pmatrix} 1 \\ 1 \end{pmatrix} \right\}$$

Equation (19) is obtained by transforming Equation (18).

$$\begin{pmatrix} x_1 \\ x_2 \end{pmatrix} = \frac{1}{a_{11}a_{22} - a_{12}a_{21}} \begin{pmatrix} a_{22} & -a_{12} \\ -a_{21} & a_{11} \end{pmatrix} \left\{ \begin{pmatrix} w_1 \\ w_2 \end{pmatrix} - \begin{pmatrix} b_{11} + b_{12} \\ b_{21} + b_{22} \end{pmatrix} \right\} \qquad (19)$$

According to Equation (19), the actions $x_1$ and $x_2$ are calculated as in Equations (20) and (21), respectively.

$$x_1 = \frac{a_{22}(w_1 - b_{11} - b_{12}) + a_{12}(-w_2 + b_{21} + b_{22})}{a_{11}a_{22} - a_{12}a_{21}} \qquad (20)$$

$$x_2 = \frac{a_{21}(-w_1 + b_{11} + b_{12}) + a_{11}(w_2 - b_{21} - b_{22})}{a_{11}a_{22} - a_{12}a_{21}} \qquad (21)$$

Figure 16:
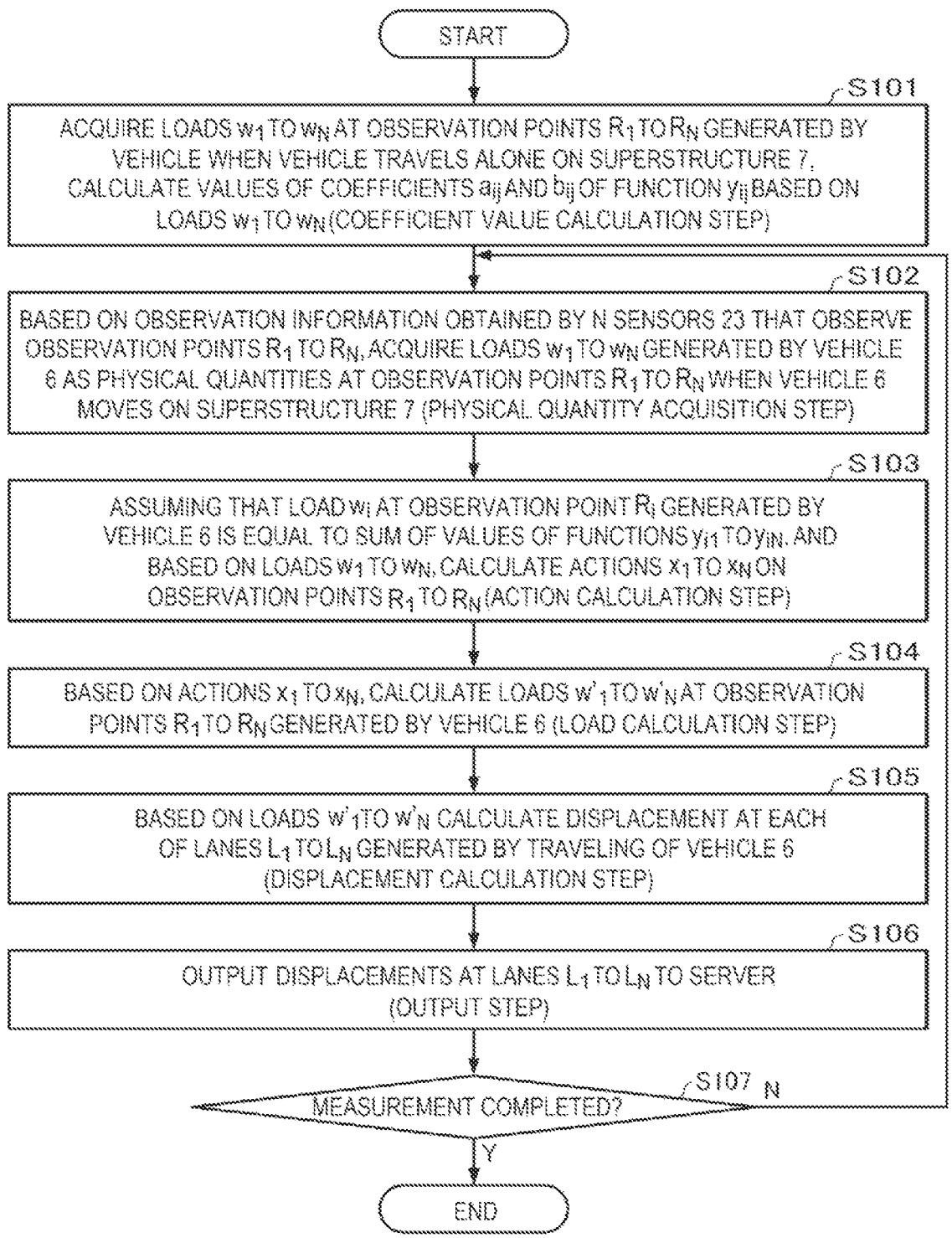
FIG. 16 is a flowchart showing an example of a procedure of a measurement method according to a second embodiment.

FIG. 16 is a flowchart showing an example of a procedure of the measurement method according to the second embodiment. In the present embodiment, the measurement device 1 executes the procedure shown in FIG. 16.

As shown in FIG. 16, first, the measurement device 1 acquires the loads $w_1$ to $w_N$ at the observation points $R_1$ to $R_N$ generated by a vehicle when the vehicle travels alone on the superstructure 7, and calculates, based on the loads $w_1$ to $w_N$, values of the coefficients $a_{ij}$ and $b_{ij}$ of the function $y_{ij}$ (step S101). i is any integer of 1 or more and N or less, and j is any integer of 1 or more and N or less. The vehicle is a known moving object different from the vehicle 6 which is an unknown moving object. Specifically, the measurement device 1 calculates the inverse matrix $A^{-1}$ of the first-order coefficient matrix A and the zero-order coefficient matrix B included in Equation (17). The step S101 is a coefficient value calculation step.

Next, based on the observation information obtained by the N sensors 23 that observe the observation points $R_1$ to $R_N$, the measurement device 1 acquires the loads $w_1$ to $w_N$ generated by the vehicle 6 as the physical quantities at the observation points $R_1$ to $R_N$ when the vehicle 6 moves on the superstructure 7 (step S102). As described above, the N sensors 23 are acceleration sensors. The observation information obtained by the N sensors 23 is detection information on the accelerations generated at the observation points $R_1$ to $R_N$. Then, the acceleration is an acceleration in the third direction which intersects the X direction, which is the first direction, and the Y direction, which is the second direction. The measurement device 1 calculates the load vector w included in Equation (17) based on the acceleration in the third direction detected by each of the N sensors 23. Therefore, the loads $w_1$ to $w_N$ as the physical quantities at the observation points $R_1$ to $R_N$ acquired by the measurement device 1 in a physical quantity acquisition step are loads in the third direction intersecting the X and Y directions, respectively, for example, loads in the third direction that is orthogonal to the X and Y directions, respectively. The step S102 is the physical quantity acquisition step.

Next, assuming that the load $w_i$ generated by the vehicle 6 at the observation point $R_i$ is equal to the sum of the values of the functions $y_{i1}$ to $y_{iN}$, and based on the loads $w_1$ to $w_N$ acquired in step S102, the measurement device 1 calculates the actions $x_1$ to $x_N$ on the observation points $R_1$ to $R_N$ (step S103). i is any integer of 1 or more and N or less. Specifically, the measurement device 1 calculates the action vector X by substituting the inverse matrix $A^{-1}$ of the first-order coefficient matrix A and the zero-order coefficient matrix B which are calculated in step S101 and the load vector w calculated in step S102 into Equation (17). The step S103 is an action calculation step.

Next, based on the actions $x_1$ to $x_N$ calculated in step S103, the measurement device 1 calculates loads $w'_1$ to $w'_N$ at the observation points $R_1$ to $R_N$ generated by the vehicle 6 (step S104). For example, for each integer j of 1 or more and N or less, a load $f_j$ calculated assuming that all actions among the actions $x_1$ to $x_N$ except the action $x_j$ in the right-hand side of Equation (14) are zero is defined as a load $w'_j$. The step S104 is a load calculation step.

Next, based on the loads $w'_1$ to $w'_N$ calculated in step S104, the measurement device 1 calculates the displacement at each of the lanes $L_1$ to $L_N$ generated by the traveling of the vehicle 6 (step S105). For each integer j of 1 or more and N or less, since there is a correlation between the load $w'_j$ and the displacement at the lane $L_j$, a coefficient of a correlation equation is calculated in advance in a load test of a vehicle. The measurement device can calculate the displacement at the lane $L_j$ by substituting the load $w'_j$ into the correlation equation. The step S105 is a displacement calculation step.

Next, the measurement device 1 outputs the displacements at the lanes $L_1$ to $L_N$ calculated in step S105 to the server 2 (step S106). The step S106 is an output step.

The measurement device 1 repeats the processing in steps S102 to S106 until the measurement is completed (Y in step S107).

The configuration of the measurement device 1 according to the second embodiment is the same as that in FIG. 15, and thus illustration thereof will be omitted. Similar to the first embodiment, the measurement device 1 includes the control unit 110, the first communication unit 120, the storage unit 130, the second communication unit 140, and the operation unit 150.

Since the processing performed by the first communication unit 120, the storage unit 130, the second communication tion unit 140, and the operation unit 150 are the same as that in the first embodiment, the description thereof will be omitted.

The control unit 110 calculates the load generated by the vehicle 6 or the like based on the acceleration data output from each of the sensors 23 installed in the superstructure 7. Similar to the first embodiment, the control unit 110 includes the physical quantity acquisition unit 111, the action calculation unit 112, the displacement calculation unit 113, the load calculation unit 114, the coefficient value calculation unit 115, and the output processing unit 116.

Based on the observation information obtained by the N sensors 23 that observe the observation points $R_1$ to $R_N$, the physical quantity acquisition unit 111 acquires the loads $w_1$ to $w_N$ generated by the vehicle 6 as the physical quantities at the observation points $R_1$ to $R_N$ when the vehicle 6 moves on the superstructure 7. That is, the physical quantity acquisition unit 111 performs the processing of the physical quantity acquisition step in FIG. 16. The loads $w_1$ to $w_N$ acquired by the physical quantity acquisition unit 111 are stored in the storage unit 130.

Based on the loads $w_1$ to $w_N$ acquired by the physical quantity acquisition unit 111, on the assumption that, for any integer i of 1 or more and N or less, the load $w_i$ at the observation point $R_i$ generated by the vehicle 6 is equal to the sum of the values of the functions $y_{i1}$ to $y_{iN}$, the action calculation unit 112 calculates the actions $x_1$ to $x_N$ on the observation points $R_1$ to $R_N$. That is, the action calculation unit 112 performs the processing of the action calculation step in FIG. 16. The actions $x_1$ to $x_N$ calculated by the action calculation unit 112 are stored in the storage unit 130.

Based on the loads $w'_1$ to $w'_N$ calculated by the load calculation unit 114, the displacement calculation unit 113 calculates the displacement at each of the lanes $L_1$ to $L_N$ generated by the traveling of the vehicle 6. That is, the displacement calculation unit 113 performs the processing of the displacement calculation step in FIG. 16. The displacement at each of the lanes $L_1$ to $L_N$ generated by the traveling of the vehicle 6 and calculated by the displacement calculation unit 113 is stored in the storage unit 130.

Based on the actions $x_1$ to $x_N$ calculated by the action calculation unit 112, the load calculation unit 114 calculates the loads $w'_1$ to $w'_N$ generated by the vehicle 6 at the observation points $R_1$ to $R_N$. That is, the load calculation unit 114 performs the processing of the load calculation step in FIG. 16. The loads $w'_1$ to $w'_N$ calculated by the load calculation unit 114 are stored in the storage unit 130.

For any integers i and j of 1 or more and N or less, the coefficient value calculation unit 115 acquires the loads $w_1$ to $w_N$ at the observation points $R_1$ to $R_N$ generated by the vehicle when the vehicle travels alone on the superstructure 7, and calculates, based on the loads $w_1$ to $w_N$, the values of the coefficients $a_{ij}$ and $b_{ij}$ of the function $y_{ij}$. That is, the coefficient value calculation unit 115 performs the processing of the coefficient value calculation step in FIG. 16. The values of the first-order coefficients $a_{11}$ to $a_{NN}$ and the values of the zero-order coefficients $b_{11}$ to $b_{NN}$ calculated by the coefficient value calculation unit 115 are stored in the storage unit 130.

The output processing unit 116 performs processing of outputting the displacements at the lanes $L_1$ to $L_N$ calculated by the displacement calculation unit 113 to the server 2 via the second communication unit 140. That is, the output processing unit 116 performs the processing of the output step in FIG. 16.

For example, based on the operation data from the operation unit 150, the control unit 110 switches between a first mode for calculating the load generated by the unknown vehicle 6, and a second mode for calculating the first-order coefficients $a_{11}$ to $a_{NN}$ and the zero-order coefficients $b_{11}$ to $b_{NN}$. For example, after the N sensors 23 are installed in the superstructure 7, the load test of a plurality of vehicles is performed in a state in which the control unit 110 is set to the second mode. After the load test ends, the control unit 110 is set to the first mode.

Similar to the first embodiment, the control unit 110 is a processor that executes various programs stored in the storage unit 130. By executing the measurement program 131 stored in the storage unit 130, functions of the physical quantity acquisition unit 111, the action calculation unit 112, the displacement calculation unit 113, the load calculation unit 114, the coefficient value calculation unit 115, and the output processing unit 116 are implemented. In other words, the measurement program 131 is a program that causes the measurement device 1, which is a computer, to execute each procedure in the flowchart shown in FIG. 16. The control unit 110 is implemented as a custom IC such as an ASIC, and may implement the function of each part, or may implement the function of each part by the CPU and the ASIC.

The control unit 110 may not include the displacement calculation unit 113. The control unit 110 may not include the coefficient value calculation unit 115. For example, the server 2 or another device may perform processing of calculating the values of the first-order coefficients $a_{11}$ to $a_{NN}$ and the values of the zero-order coefficients $b_{11}$ to $b_{NN}$, and store the values in the storage unit 130 of the measurement device 1.

In the measurement method according to the second embodiment described above, based on the observation information obtained by the N sensors 23 that observe the observation points $R_1$ to $R_N$, the measurement device 1 acquires the loads $w_1$ to $w_N$ generated by the vehicle 6 as the physical quantities at the observation points $R_1$ to $R_N$. Then, on the assumption that, when a function indicating a correlation between the action $x_j$ on the observation point $R_j$ and the action that the action $x_j$ has on the observation point $R_i$ is set as $y_{ij}$, the load $w_i$ is equal to the sum of the values of the functions $y_{i1}$ to $y_{iN}$, the measurement device 1 calculates the actions $x_1$ to $x_N$ on the observation points $R_1$ to $R_N$ according to Equation (17) and based on the loads $w_1$ to $w_N$. Therefore, according to the measurement method in the second embodiment, the measurement device 1 can calculate the action $x_j$ when the vehicle 6, which is a moving object, passes the observation point $R_j$ of the superstructure 7, which is a structure, separately from other actions. For example, even when a plurality of vehicles 6 travel adjacently on a plurality of lanes, the measurement device 1 can calculate the action $x_j$ on the observation point $R_j$ generated by the vehicle 6 traveling on the lane L by excluding the influence of the action on the observation point $R_j$ that the action $x_1$ on the observation point $R_1$ generated by the vehicle 6 traveling on the lane $L_1$ has.

In the measurement method according to the second embodiment, the measurement device 1 calculates, based on the actions $x_1$ to $x_N$ on the observation points $R_1$ to $R_N$, the loads $w'_1$ to $w'_N$ at the observation points $R_1$ to $R_N$ generated by the vehicle 6, and calculates the displacements at the observation points $R_1$ to $R_N$ based on the loads $w'_1$ to $w'_N$. Therefore, according to the measurement method in the second embodiment, the measurement device 1 can accurately calculate, based on the action $x_j$ on the observation point $R_j$ which is calculated separately from other actions, the load and the displacement at the observation point $R_j$ generated by the traveling of the vehicle 6. For example, even when a plurality of vehicles 6 travel adjacently on the plurality of lanes, the measurement device 1 can accurately calculate the load and the displacement at the lane L generated by the vehicle 6 moving along the lane $L_j$. Based on the information on the load and the displacement, for example, the measurement device 1 or the server 2 can accurately perform processing such as monitoring of an overloaded vehicle and abnormality determination of the superstructure 7.

3. Modifications

The present disclosure is not limited to the above embodiments, and various modifications can be made within the scope of the gist of the present disclosure.

In each of the embodiments described above, the function $y_{ij}$ indicating the correlation between the action $x_j$ on the observation point R when the vehicle 6 travels on the lane $L_j$ and the action that the action $x_j$ on the observation point R has on the observation point $R_1$ is set to a first-order polynomial function shown in Equation (1), but when the correlation is not a straight line, the function $y_{ij}$ may be an m-order polynomial function as shown in Equation (22).

$$y_{ij}=a_{m_{ij}}x_j^m+a_{m-1_{ij}}x_j^{m-1}+a_{m-2_{ij}}x_j^{m-2}+\ldots \quad (22)$$

In each of the above embodiments, the observation devices that observe the observation points $R_1$ to $R_N$ are acceleration sensors, but the present disclosure is not limited thereto. For example, the observation device may be a contact displacement meter, a ring displacement meter, a laser displacement meter, a pressure sensor, a displacement measurement device based on image processing, or a displacement measurement device based on an optical fiber. It is not necessary that the observation device and the observation point have a one-to-one correspondence, and one observation device may observe a part or all of the observation points $R_1$ to $R_N$.

The contact displacement meter, the ring displacement meter, the laser displacement meter, the displacement measurement device based on image processing, or the displacement measurement device based on an optical fiber measure a displacement as a response to the action on each of the observation points $R_1$ to $R_N$ generated by the vehicle 6. The measurement device 1 calculates, based on the displacements at the observation points $R_1$ to $R_N$, displacements or loads generated by the vehicle 6 as physical quantities at the observation points $R_1$ to $R_N$. The pressure sensor detects a stress change as a response to the action on each of the observation points $R_1$ to $R_N$ generated by the vehicle 6. The measurement device 1 calculates, based on the stress changes at the observation points $R_1$ to $R_N$, displacements or loads generated by the vehicle 6 as the physical quantities at the observation points $R_1$ to $R_N$.

In each of the above embodiments, the traveling directions of the vehicles 6 on the lanes $L_1$ to $L_N$ are all the same, but the traveling direction of the vehicle 6 on at least one lane of the lanes $L_1$ to $L_N$ may be different from those on other lanes.

In each of the above embodiments, the sensor 23 is provided on the main girder G of the superstructure 7, but the sensor may be provided on the surface or inside of the superstructure 7, a lower surface of the floor plate F, the bridge pier 8a, or the like. In each of the above embodiments, the road bridge is taken as an example of the bridge 5, but the present disclosure is not limited thereto. For example, the bridge 5 may be a railway bridge. In each of the above embodiments, the superstructure of the bridge is taken as an example of the structure, but the present disclosure is not limited thereto. The structure may be deformed by the movement of the moving object.

The embodiments and the modification described above are merely examples, and the present disclosure is not limited thereto. For example, the embodiments and the modification can be combined as appropriate.

The present disclosure includes a configuration substantially the same as the configuration described in the embodiments, for example, a configuration having the same function, method, and result, or a configuration having the same object and effect. The present disclosure includes a configuration obtained by replacing a non-essential portion of the configuration described in the embodiment. In addition, the present disclosure includes a configuration having the same operation effect as the configuration described in the embodiment, or a configuration capable of achieving the same object. The present disclosure includes a configuration obtained by adding a known technique to the configuration described in the embodiment.

What is claimed is:

1. A measurement method comprising:
a physical quantity acquisition step of acquiring, based on observation information obtained by at least one observation device that observes first to N-th observation points of a structure arranged along a second direction intersecting a first direction in which a moving object moves along the structure, physical quantities at the first to N-th observation points, N being an integer of 2 or more; and
an action calculation step of calculating actions $x_1$ to $x_N$ on the first to N-th observation points based on the physical quantities at the first to N-th observation points acquired in the physical quantity acquisition step, on the assumption that, for any integer i of 1 or more and N or less and any integer j of 1 or more and N or less, when a function indicating a correlation between an action $x_j$ on a j-th observation point and an action that the action $x_j$ has on an i-th observation point is set as $y_{ij}$, a physical quantity at the i-th observation point acquired in the physical quantity acquisition step is equal to a sum of values of functions $y_{i1}$ to $y_{iN}$.

2. The measurement method according to claim 1, further comprising:
a coefficient value calculation step of acquiring physical quantities at the first to N-th observation points when a known moving object different from the moving object moves alone on the structure, and calculating a value of a coefficient of the function $y_{ij}$ based on the physical quantities at the first to N-th observation points.

3. The measurement method according to claim 1, wherein the function $y_{ij}$ is a polynomial function of the action $x_j$.

4. The measurement method according to claim 1, wherein the structure has first to N-th paths through which the moving object is able to move, and
the first to N-th observation points are associated with the first to N-th paths.

5. The measurement method according to claim 1, wherein the physical quantities at the first to N-th observation points acquired in the physical quantity acquisition step are displacements or loads generated by the moving object.

6. The measurement method according to claim 1, wherein the observation device is an acceleration sensor.

7. The measurement method according to claim 1, wherein the observation device is a contact displacement meter, a ring displacement meter, a laser displacement meter, a pressure sensor, a displacement measurement device based on image processing, or a displacement measurement device based on an optical fiber.

8. The measurement method according to claim 1, wherein
the physical quantities at the first to N-th observation points acquired in the physical quantity acquisition step are physical quantities in a third direction intersecting the first direction and the second direction.

9. The measurement method according to claim 1, wherein
the moving object is a railroad vehicle, an automobile, a tram, a construction vehicle, or a military vehicle.

10. The measurement method according to claim 1, wherein
the structure is a superstructure of a bridge,
the superstructure is a structure across any one of a bridge abutment and a bridge pier adjacent to each other, two adjacent bridge abutments, or two adjacent bridge piers,
both end portions of the superstructure are located at positions of the bridge abutment and the bridge pier adjacent to each other, at positions of the two adjacent bridge abutments, or at positions of the two adjacent bridge piers, and
the bridge is a road bridge or a railway bridge.

11. The measurement method according to claim 1, wherein the structure is a structure in which bridge weigh in motion (BWIM) functions.

12. A measurement device comprising:
a physical quantity acquisition unit that acquires, based on observation information obtained by at least one observation device that observes first to N-th observation points of a structure arranged along a second direction intersecting a first direction in which a moving object moves along the structure, physical quantities at the first to N-th observation points, N being an integer of 2 or more; and
an action calculation unit that calculates actions $x_1$ to $x_N$ on the first to N-th observation points based on the physical quantities at the first to N-th observation points acquired by the physical quantity acquisition unit on the assumption that, for any integer i of 1 or more and N or less and any integer j of 1 or more and N or less, when a function indicating a correlation between an action $x_j$ on a j-th observation point and an action that the action $x_j$ has on an i-th observation point is set as $y_{ij}$, a physical quantity at the i-th observation point acquired by the physical quantity acquisition unit is equal to a sum of values of functions $y_{i1}$ to $y_{iN}$.

13. A measurement system comprising:
the measurement device according to claim 12; and
the observation device.

14. A non-transitory computer-readable storage medium storing a measurement program, the measurement program causing a computer to execute:
a physical quantity acquisition step of acquiring, based on observation information obtained by at least one observation device that observes first to N-th observation points of a structure arranged along a second direction intersecting a first direction in which a moving object moves along the structure, physical quantities at the first to N-th observation points, N being an integer of 2 or more; and
an action calculation step of calculating actions $x_1$ to $x_N$ on the first to N-th observation points based on the physical quantities at the first to N-th observation points acquired in the physical quantity acquisition step, on the assumption that, for any integer i of 1 or more and N or less and any integer j of 1 or more and N or less, when a function indicating a correlation between an action $x_j$ on a j-th observation point and an action that the action $x_j$ has on an i-th observation point is set as $y_{ij}$, a physical quantity at the i-th observation point acquired in the physical quantity acquisition step is equal to a sum of values of functions $y_{i1}$ to $y_{iN}$.

* * * * *